US008620042B2

(12) United States Patent
Kitamura et al.

(10) Patent No.: US 8,620,042 B2
(45) Date of Patent: Dec. 31, 2013

(54) IMAGE PROCESSING APPARATUS, IMAGE PROCESSING METHOD, AND COMPUTER-READABLE RECORDING MEDIUM

(75) Inventors: Makoto Kitamura, Hachioji (JP); Yamato Kanda, Hino (JP); Takehiro Matsuda, Hachioji (JP); Takashi Kono, Tachikawa (JP); Masashi Hirota, Hachioji (JP)

(73) Assignee: Olympus Corporation, Tokyo (JP)

( * ) Notice: Subject to any disclaimer, the term of this patent is extended or adjusted under 35 U.S.C. 154(b) by 310 days.

(21) Appl. No.: 13/215,599

(22) Filed: Aug. 23, 2011

(65) Prior Publication Data

US 2012/0051654 A1 Mar. 1, 2012

(30) Foreign Application Priority Data

Aug. 24, 2010 (JP) ................. 2010-187678

(51) Int. Cl.
*G06K 9/00* (2006.01)
(52) U.S. Cl.
USPC ............ 382/128; 382/103; 382/173; 382/199
(58) Field of Classification Search
USPC ......... 382/103, 128, 131, 132, 173, 199, 266, 382/282
See application file for complete search history.

(56) References Cited

U.S. PATENT DOCUMENTS

| 5,239,591 | A | * | 8/1993 | Ranganath | ................. | 382/128 |
| 5,487,116 | A | * | 1/1996 | Nakano et al. | ................. | 382/104 |
| 6,631,206 | B1 | * | 10/2003 | Cheng et al. | ................. | 382/164 |
| 6,678,416 | B1 | * | 1/2004 | Sun et al. | ................. | 382/235 |
| 6,728,401 | B1 | * | 4/2004 | Hardeberg | ................. | 382/167 |

(Continued)

FOREIGN PATENT DOCUMENTS

| EP | 2 305 091 A1 | 4/2011 |
| JP | 2002-099896 A | 4/2002 |
| WO | WO 2009/154125 A1 | 12/2009 |

OTHER PUBLICATIONS

Jin, H. and Kobatake, H., "Extraction of Microcalcifications on Mammogram Using Morphological Filter with Multiple Structuring Elements", The Transactions of the Institute of Electronics, Information and Communication Engineers, Jul. 1992, D-II , vol. J75-D-II, No. 7, pp. 1170-1176 together with English language abstract.

(Continued)

*Primary Examiner* — Aaron W Carter
(74) *Attorney, Agent, or Firm* — Scully, Scott, Murphy & Presser, P.C.

(57) ABSTRACT

An apparatus includes a calculating unit that calculates gradient strength of respective pixel values based on an intraluminal image, an extracting unit that extracts a closed region from the image, and a detecting unit that detects an abnormal portion of the closed region. The closed region satisfies conditions that the pixel of which gradient strength is a predetermined value or more is not included in the closed region and a boundary of the closed region does not bend with predetermined curvature or higher toward an inner side of the closed region. The extracting unit includes a setting unit that sets an initial closed region based on the gradient strength, an energy calculating unit that calculates values of types of energies based on an outer shape of the closed region and the gradient strength, and an energy weighted-sum calculating unit that calculates a weighted sum of the types of energy.

32 Claims, 20 Drawing Sheets

(56) References Cited

U.S. PATENT DOCUMENTS

| | | | |
|---|---|---|---|
| 6,912,310 B1* | 6/2005 | Park et al. | 382/199 |
| 6,996,340 B2* | 2/2006 | Yamaguchi et al. | 396/263 |
| 7,536,041 B2* | 5/2009 | Pekar et al. | 382/128 |
| 7,646,902 B2* | 1/2010 | Chan et al. | 382/128 |
| 8,103,077 B2* | 1/2012 | Hong et al. | 382/132 |
| 8,180,154 B2* | 5/2012 | Collier et al. | 382/180 |
| 2002/0062061 A1* | 5/2002 | Kaneko et al. | 600/118 |
| 2002/0063893 A1* | 5/2002 | Fujieda | 358/1.15 |
| 2002/0118875 A1* | 8/2002 | Wilensky | 382/173 |
| 2003/0036751 A1* | 2/2003 | Anderson et al. | 606/9 |
| 2003/0139650 A1* | 7/2003 | Homma | 600/181 |
| 2004/0218916 A1* | 11/2004 | Yamaguchi et al. | 396/263 |
| 2005/0129296 A1* | 6/2005 | Setala | 382/131 |
| 2006/0159341 A1* | 7/2006 | Pekar et al. | 382/173 |
| 2007/0230767 A1* | 10/2007 | Iwamatsu et al. | 382/133 |
| 2007/0260214 A1* | 11/2007 | Mikkaichi et al. | 604/500 |
| 2008/0040083 A1* | 2/2008 | Odry et al. | 703/2 |
| 2008/0181481 A1* | 7/2008 | Hong et al. | 382/132 |
| 2008/0240526 A1* | 10/2008 | Suri et al. | 382/128 |
| 2009/0196476 A1* | 8/2009 | Inoue | 382/128 |
| 2009/0202124 A1* | 8/2009 | Matsuda et al. | 382/128 |
| 2010/0067742 A1* | 3/2010 | Ogawa | 382/103 |
| 2010/0092055 A1* | 4/2010 | Matsuda | 382/128 |
| 2010/0104154 A1* | 4/2010 | Chan et al. | 382/128 |
| 2010/0134517 A1* | 6/2010 | Saikaly et al. | 345/619 |
| 2010/0166283 A1* | 7/2010 | Grosskopf | 382/131 |
| 2010/0177957 A1* | 7/2010 | Ogawa | 382/160 |
| 2011/0002522 A1* | 1/2011 | Goto et al. | 382/131 |
| 2011/0019886 A1* | 1/2011 | Mizuno | 382/128 |
| 2011/0158474 A1* | 6/2011 | Srikrishnan et al. | 382/103 |
| 2011/0176730 A1* | 7/2011 | Sasaki | 382/167 |
| 2011/0181614 A1* | 7/2011 | Chang et al. | 345/595 |
| 2011/0274321 A1* | 11/2011 | Kono et al. | 382/128 |
| 2012/0051612 A1* | 3/2012 | Kitamura et al. | 382/128 |
| 2012/0051654 A1* | 3/2012 | Kitamura et al. | 382/199 |
| 2012/0230572 A1* | 9/2012 | Kohlberger et al. | 382/131 |

OTHER PUBLICATIONS

Kobatake, H. et al., "Basic Theory of Mathematical Morphology and Its Application to Mammogram Processing", Medical Imaging Technology, Jan. 1994, vol. 12, No. 1, pp. 59-66 together with English language abstract.

Liang, J. et al., "Interactive Medical Image Segmentation with United Snakes", Jan. 1, 2006, Medical Image Computing and Computer Assisted Intervention—Miccai '99: Second International Conference, Cambridge, UK, Sep. 19-22, 1999, pp. 116-127.

European Search Report dated Dec. 20, 2012 from corresponding European Application Publication No. 11 00 6850.9.

* cited by examiner

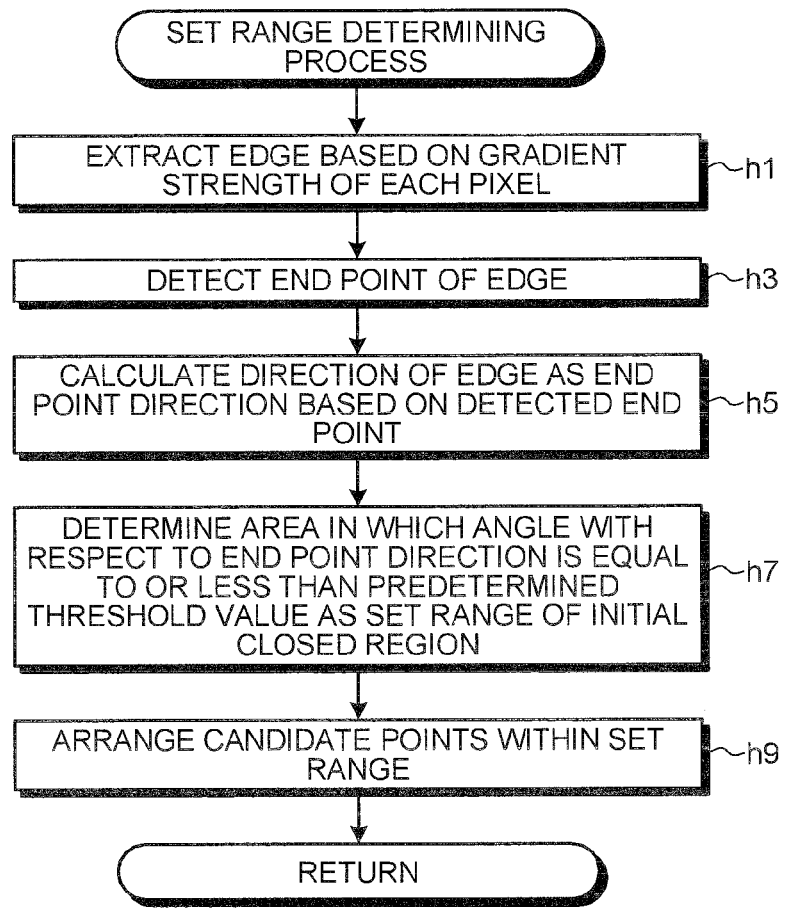
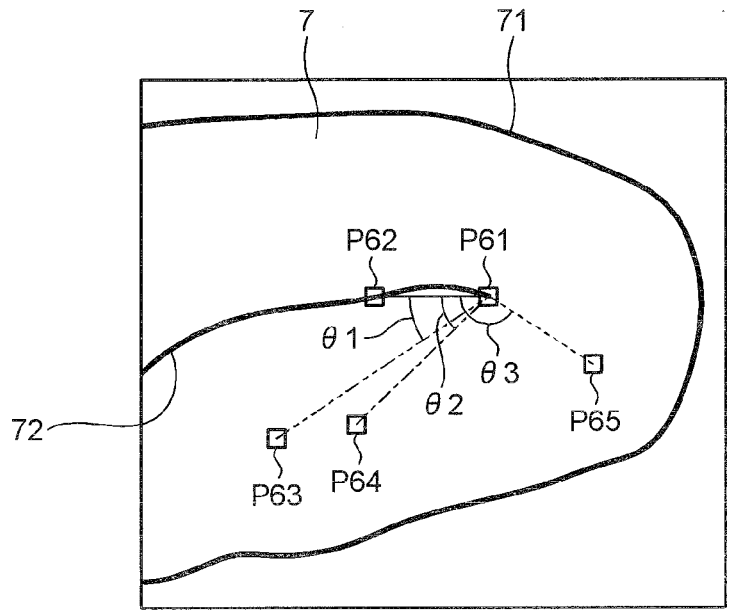

IMAGE PROCESSING APPARATUS, IMAGE PROCESSING METHOD, AND COMPUTER-READABLE RECORDING MEDIUM

CROSS-REFERENCE TO RELATED APPLICATIONS

This application is based upon and claims the benefit of priority from Japanese Patent Application No. 2010-187678, filed on Aug. 24, 2010, the entire contents of which are incorporated herein by reference.

BACKGROUND OF THE INVENTION

1. Field of the Invention

The present invention relates to an image processing apparatus, an image processing method, and a computer-readable recording medium for processing an intraluminal image that is a captured image of an intralumen.

2. Description of the Related Art

Conventionally, endoscopes are widely used as a medical observation device of a type that is introduced inside a body of an examinee such as a patient and observes the inside of a lumen of the body. In addition, recently, an eating-type endoscope (capsule endoscope) is developed in which an imaging device, a communication device transmitting image data imaged by the imaging device outside the body in a wireless manner, and the like are provided in a capsule-type casing. Since observation and diagnosis using an image of the inside of a lumen (intraluminal image) that is imaged with the medical observation device requires abundant experience, a medical diagnosis supporting function that supports the diagnosis of a doctor is desired. As one of image recognition technologies for realizing such a function, a technology is proposed which automatically detects an abnormal portion such as a lesion from an intraluminal image and presents the abnormal portion to a medical doctor or others.

For example, in Japanese Laid-open Patent Publication No. 2002-99896, a technology is disclosed in which candidates for a microcalcification shading that is one feature of a cancerous portion of breast cancer are stably detected by using a shape-dependent filter regardless of a coarse structure or a linear structure. In Japanese Laid-open Patent Publication No. 2002-99896, a second shape-dependent filter is prepared in advance, of which filter characteristics are optimized in accordance with various conditions such as photographing conditions, reading conditions, image contrast, and the size of a microcalcification shading, combined conditions thereof, or the like based on the supposed shape of the microcalcification shading. Then, a microstructure image representing a microstructure potion is generated by eliminating a linear structure formed inside the image by using a first shape-dependent filter that is a morphology filter (for example, Kohata et al., "Extraction of Microcalcification Image Through Morphology Filter Using Multiple Structure Element", The Institute of Electronic, Information, and Communication Engineers Journal, D-II, Vol. J75-D-II, No. 7, P 1170 to 1176, July 1992 or Kohata et al., "Basics of Morphology and Application to Mammogram Processing", Medical Imaging Technology, Vol. 12, No. 1, January 1994). Thereafter, by performing an enhancement process using the prepared second shape-dependent filter with respect to the microstructure image, the enhanced image is generated in which only the candidates for the microcalcification shading are enhanced more than the periphery thereof (a portion other than candidates for the microcalcification shading, including a coarse structure portion, a linear structure portion, and the like that could not be eliminated by the first shape-dependent filter).

SUMMARY OF THE INVENTION

An image processing apparatus according to an aspect of the present invention includes a gradient strength calculating unit that calculates gradient strength of a pixel value of each pixel of an intraluminal image that is a captured image of an intralumen; a closed region extracting unit that extracts a closed region from the intraluminal image, the closed region satisfying conditions that the pixel of which gradient strength is a predetermined value or more is not included in the closed region and a boundary of the closed region does not bend with predetermined curvature or higher toward an inner side of the closed region; and an abnormal portion detecting unit that detects an abnormal portion located inside the closed region. The closed region extracting unit includes an initial closed region setting unit that sets an initial closed region having an initial shape of the closed region based on the gradient strength; an energy calculating unit that calculates values of a plurality of types of energy that at least include energy determined based on an outer shape of the closed region and energy determined based on the gradient strength on the boundary of the closed region; and an energy weighted-sum calculating unit that calculates a weighted sum of the plurality of types of energy. The closed region is extracted by transforming the initial closed region based on the weighted sum. The initial closed region setting unit includes a range determining unit that determines a set range of the initial closed region based on the gradient strength.

An image processing apparatus according to another aspect of the present invention includes a gradient strength calculating unit that calculates gradient strength of a pixel value of each pixel of an intraluminal image that is a captured image of an intralumen; a closed region extracting unit that extracts a closed region from the intraluminal image, the closed region satisfying conditions that the pixel of which gradient strength is a predetermined value or more is not included in the closed region and a boundary of the closed region does not bend with predetermined curvature or higher toward an inner side of the closed region; and an abnormal portion detecting unit that detects an abnormal portion located inside the closed region. The closed region extracting unit includes an initial closed region setting unit that sets an initial closed region having an initial shape of the closed region based on the gradient strength; an energy calculating unit that calculates values of a plurality of types of energy that at least include energy determined based on an outer shape of the closed region and energy determined based on the gradient strength on the boundary of the closed region; an energy weighting factor setting unit that sets a weighting factor for at least one type of energy among the plurality of types of energy based on a position of the initial closed region; and an energy weighted-sum calculating unit that calculates a weighted sum of the plurality of types of energy. The closed region is extracted by transforming the initial closed region based on the weighted sum.

An image processing method according to still another aspect of the present invention includes calculating gradient strength of a pixel value of each pixel of an intraluminal image that a captured image of an intralumen; extracting a closed region from the intraluminal image, the closed region satisfying conditions that the pixel of which gradient strength is a predetermined value or more is not included in the closed region and a boundary of the closed region does not bend with predetermined curvature or higher toward an inner side of the closed region; and detecting an abnormal portion located inside the closed region. The extracting includes setting an initial closed region that is an initial shape of the closed region based on the gradient strength; calculating values of a plurality of types of energy that at least include energy determined based on an outer shape of the closed region and energy determined based on the gradient strength on the boundary of the closed region; and calculating a weighted sum of the plurality of types of energy. The closed region is extracted by transforming the initial closed region based on the weighted sum. The setting includes determining a set range of the initial closed region based on the gradient strength.

An image processing method according to still another aspect of the present invention includes calculating gradient strength of a pixel value of each pixel of an intraluminal image that is a captured image of an intralumen; extracting a closed region from the intraluminal image, the closed region satisfying conditions that the pixel of which gradient strength is a predetermined value or more is not included in the closed region and a boundary of the closed region does not bend with predetermined curvature or higher toward an inner side of the closed region; and detecting an abnormal portion located inside the closed region. The extracting includes setting an initial closed region having an initial shape of the closed region based on the gradient strength; calculating values of a plurality of types of energy that at least include energy determined based on an outer shape of the closed region and energy determined based on the gradient strength on the boundary of the closed region; setting a weighting factor for at least one type of energy among the plurality of types of energy based on a position of the initial closed region; and calculating a weighted sum of the plurality of types of energy. The closed region is extracted by transforming the initial closed region based on the weighted sum.

A non-transitory computer-readable storage medium according to still another aspect of the present invention has an executable program stored thereon. The program instructs a processor to perform: calculating gradient strength of a pixel value of each pixel of an intraluminal image that is a captured image of an intralumen; extracting a closed region from the intraluminal image, the closed region satisfying conditions that the pixel of which gradient strength is a predetermined value or more is not included in the closed region and a boundary of the closed region does not bend with predetermined curvature or higher toward an inner side of the closed region; and detecting an abnormal portion located inside the closed region. The extracting includes setting an initial closed region having an initial shape of the closed region based on the gradient strength; calculating values of a plurality of types of energy that at least include energy determined based on an outer shape of the closed region and energy determined based on the gradient strength on the boundary of the closed region; and calculating a weighted sum of the plurality of types of energy. The closed region is extracted by transforming the initial closed region based on the weighted sum. The setting includes determining a set range of the initial closed region based on the gradient strength.

A non-transitory computer-readable storage medium according to still another aspect of the present invention has an executable program stored thereon. The program instructs a processor to perform: calculating gradient strength of a pixel value of each pixel of an intraluminal image that is a captured image of an intralumen; extracting a closed region from the intraluminal image, the closed region satisfying conditions that the pixel of which gradient strength is a predetermined value or more is not included in the closed region and a boundary of the closed region does not bend with predetermined curvature or higher toward an inner side of the closed region; and detecting an abnormal portion located inside the closed region. The extracting includes setting an initial closed region having an initial shape of the closed region based on the gradient strength; calculating values of a plurality of types of energy that at least include energy determined based on an outer shape of the closed region and energy determined based on the gradient strength on the boundary of the closed region; setting a weighting factor for at least one type of energy among the plurality of types of energy based on a position of the initial closed region; and calculating a weighted sum of the plurality of types of energy. The closed region is extracted by transforming the initial closed region based on the weighted sum.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 19 is a flowchart illustrating the detailed processing sequence of a set range determining process according to the second embodiment;

FIG. 20 is a schematic diagram illustrating an example of an intraluminal image;

DETAILED DESCRIPTION OF THE PREFERRED EMBODIMENTS

Figure 1:
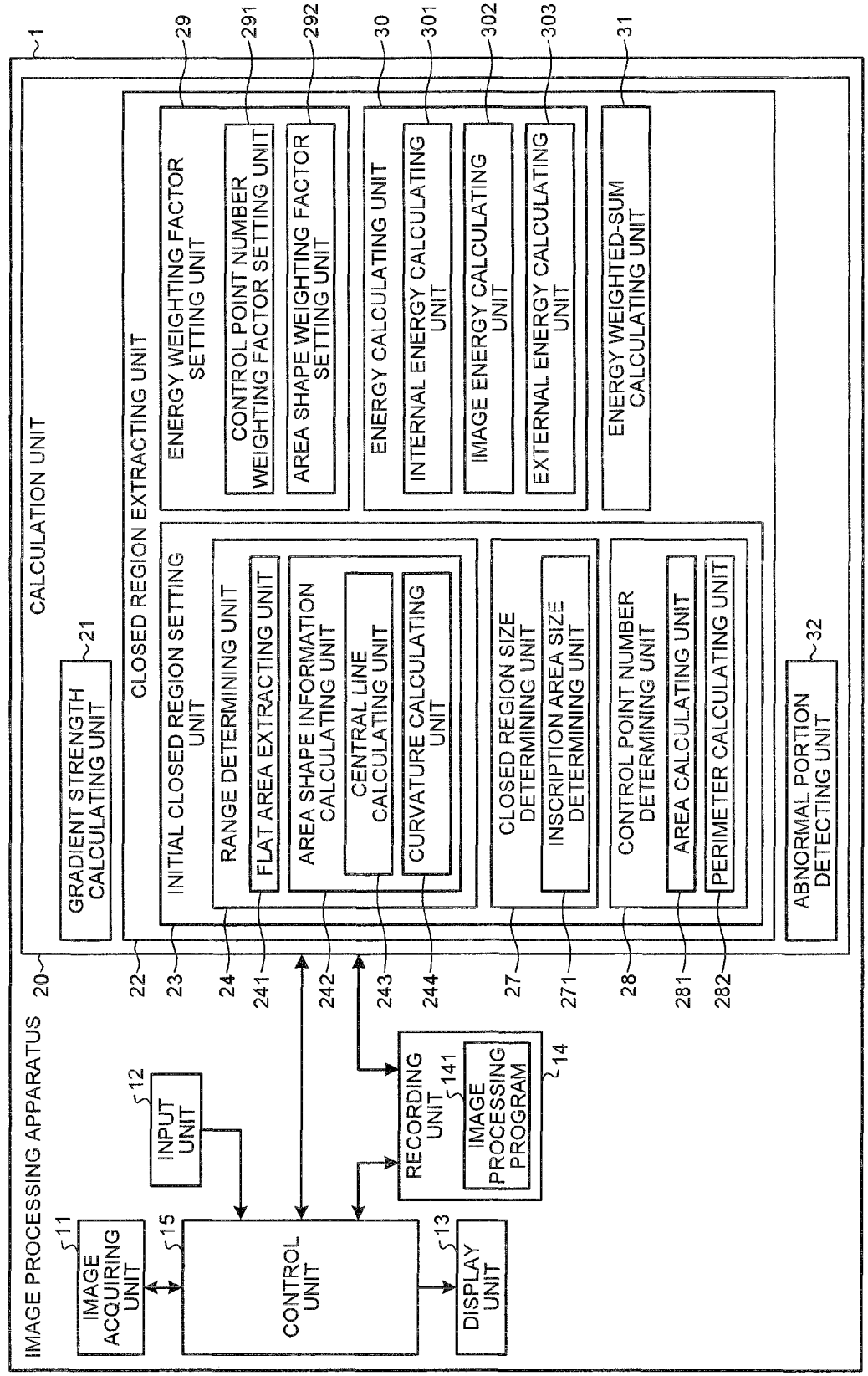
FIG. 1 is a block diagram illustrating the functional configuration of an image processing apparatus according to a first embodiment.

Hereinafter, preferred embodiments of the present invention will be described with reference to the accompanying drawings. However, the present invention is not limited thereto. In all of the drawings, the same components are denoted by the same reference numerals.

An image processing apparatus according to an embodiment performs a process of detecting an abnormal portion such as a lesion or a bleeding site from an intraluminal image by processing an image (intraluminal image) that is acquired by imaging a lumen inside a body such as a gastrointestinal tract of the inside of a body of an examinee by using a medical observation device such as an endoscope or a capsule endoscope. As described above, on the intraluminal image, the shading or contour of a groove formed by a body tissue such as a mucous membrane structure is reflected. In this embodiment, in order to suppress an incorrect detection of a groove position or a contour portion as an abnormal portion, a closed region is extracted so as not to include the groove position or the contour portion on the inside or the boundary thereof inside the intraluminal image, and an abnormal portion is detected for each extracted closed region. In the embodiment, the intraluminal image is a color image, for example, having pixel values for wavelength components red (R), green (G), and blue (B) for each pixel.

First Embodiment

First, an image processing apparatus according to a first embodiment will be described. FIG. 1 is a block diagram illustrating the functional configuration of an image processing apparatus 1 according to the first embodiment. The image processing apparatus 1 according to the first embodiment, as illustrated in FIG. 1, includes an image acquiring unit 11, an input unit 12, a display unit 13, a recording unit 14, a calculating unit 20, and a control unit 15 that controls the overall operation of the image processing apparatus 1.

The image acquiring unit 11 is used for acquiring image data of an intraluminal image that is imaged by a medical observation device, and the image data of the intraluminal image acquired by the image acquiring unit 11 is recorded in the recording unit 14, is processed by the calculating unit 20, and then, is appropriately displayed on the display unit 13 as is necessary. In a case where a portable recording medium is used for transmitting and receiving the image data to and from the medical observation device, for example, like a case where the medical observation device is a capsule endoscope or the like, the image acquiring unit 11 includes a reader device to which the recording medium is detachably attached and reads out the stored image data of the intraluminal image. On the other hand, in a case where a server storing the image data of an intraluminal image that is imaged by the medical observation device is placed at an appropriate site, and the image data is acquired from the server, the image acquiring unit 11 includes a communication device that is used for a connection to the server and the like. Then, the image processing apparatus 1 acquires the image data of the intraluminal image by performing data communication with the server through the image acquiring unit 11. In addition, alternatively, the image acquiring unit 11 may include an interface device or the like that receives an image signal output from the medical observation device such as an endoscope as input through a cable.

The input unit 12 is realized, for example, by a keyboard, a mouse, a touch panel, or various switches and outputs an input signal to the control unit 15. The display unit 13 is realized by a display device such as an LCD or an EL display and displays various screens including the intraluminal image under the control of the control unit 15.

The recording unit 14 is realized by various IC memories such as a ROM provided as a rewritable flash memory or the like and a RAM, a hard disk that is built in or is connected through a data communication terminal, an information recording medium such as a CD-ROM, a reading device thereof, and the like. By operating the image processing apparatus 1, a program used for realizing various functions included in the image processing apparatus 1, data used during execution of the program, and the like are recorded therein in advance or are temporarily recorded at each processing time. Image data of the intraluminal image that is acquired by the image acquiring unit 11 is recorded in the recording unit 14. In addition, in the recording unit 14, an image processing program 141 that is used for detecting an abnormal portion from the intraluminal image by realizing the process according to the first embodiment is recorded.

The calculation unit 20 is realized by hardware such as a CPU and performs various calculation processes for detecting an abnormal portion by processing the intraluminal image. This calculation unit 20 includes a gradient strength calculating unit 21, a closed region extracting unit 22, and an abnormal portion detecting unit 32.

The gradient strength calculating unit 21 calculates the gradient strength of the pixel value of each pixel based on the pixel value of each pixel of the intraluminal image.

With the conditions that a pixel of which the gradient strength is a predetermined value set in advance or more is not included inside the region, and the boundary of the region does not bend toward the inner side of the region with predetermined curvature or more, the closed region extracting unit 22 extracts a closed region satisfying the above-described conditions from the intraluminal image. This closed region extracting unit 22 includes an initial closed region setting unit 23, an energy weighting factor setting unit 29, an energy calculating unit 30, and an energy weighted-sum calculating unit 31. The closed region extracting unit 22 extracts a closed region by transforming the initial closed region based on the weighted-sum calculated by the energy weighted-sum calculating unit 31.

The initial closed region setting unit 23 sets an initial closed region having an initial shape of a closed region. This initial closed region setting unit 23 includes a range determining unit 24, a closed region size determining unit 27, and a control point number determining unit 28. The range determining unit 24 is a functional unit that determine a range (set range) inside the intraluminal image in which the initial closed region is set based on the gradient strength of each pixel and includes a flat area extracting unit 241 and an area shape information calculating unit 242. The flat area extracting unit 241 extracts from the intraluminal image an area that is made up of a plurality of pixels which have some small degree of values of the gradient strength close to those of the pixels located on the periphery thereof as a flat area. The area shape information calculating unit 242 calculates shape information of the flat area. This area shape information calculating unit 242 includes a central line calculating unit 243 that calculates a central line of the flat area and a curvature calculating unit 244 that calculates the curvature of the central line. The closed region size determining unit 27 determines the size of the initial closed region based on the set range of the initial closed region determined by the range determining unit 24. In the first embodiment, an inscription area size determining unit 271 of the closed region size determining unit 27 has a predetermined shape (for example, a circular shape) and sets the size of an area that is inscribed in the set range of the initial closed region as the size of the initial closed region. Here, the shape of the initial closed region is not limited to the circular shape and may be an appropriate shape. The control point number determining unit 28 determines the number of control points, which will be described later, of the initial closed region based on the size of the initial closed region. Here, a control point refers to a coordinate point that is located on the boundary of the closed region. This control point number determining unit 28 includes an area calculating unit 281 that calculates the area of the initial closed region and a perimeter calculating unit 282 that calculates the perimeter of the initial closed region.

The energy weighting factor setting unit 29 sets a weighting factor for at least one energy value out of a plurality of energy values calculated by the energy calculating unit 30 based on the position of the initial closed region. In the first embodiment, as weighting factors for internal energy to be described later, two types of weighting factor (a control point number weighting factor and an area shape weighting factor) are set. This energy weighting factor setting unit 29 includes a control point number weighting factor setting unit 291 and an area shape weighting factor setting unit 292. The control point number weighting factor setting unit 291 sets a control point number weighting factor based on the number of control points that is determined by the control point number determining unit 28. In the first embodiment, a set range is determined within the flat area extracted by the flat area extracting unit 241, and the initial closed region is set in the set range, which will be described later in detail. The area shape weighting factor setting unit 292 sets an area shape weighting factor based on the shape information of the flat area at the set position of the initial closed region.

The energy calculating unit 30 calculates a plurality of energy values that include at least an energy determined based on the outer shape of the closed region and an energy value determined based on the gradient strength on the boundary of the closed region. In the first embodiment, the energy calculating unit 30 includes an internal energy calculating unit 301, an image energy calculating unit 302, and an external energy calculating unit 303, and calculates three energy values of internal energy and external energy corresponding to the energy determined based on the outer shape of the closed region and image energy corresponding to the energy determined based on the gradient strength on the boundary of the closed region. Here, the internal energy represents the degree of smoothness of the boundary of the closed region and is energy that represents a smaller value as the degree of smoothness of the shape of the closed region is higher. The image energy is energy that represents a smaller value as the value of the gradient strength on the boundary of the closed region is larger. The external energy is energy that represents a smaller value as the size of the closed region is larger.

The energy weighted-sum calculating unit 31 calculates a weighted sum of the plurality of energies calculated by the energy calculating unit 30. At this time, in the first embodiment, the energy weighted-sum calculating unit 31 calculates a weighted sum of the internal energy, the image energy, and the external energy based on weighting of the internal energy by using the control point number weighting factor and the area shape weighting factor set by the energy weighting factor setting unit 29. Here, it is not necessary to calculate the weighted sum of these three energy weighting factors, and a weighted sum of any two of these three energies may be calculated.

The abnormal portion detecting unit 32 detects an abnormal portion located on the inner side (inside) of the boundary of each closed region.

The control unit 15 is realized by hardware such as a CPU. This control unit 15 controls the overall operation of the image processing apparatus 1 by transmitting instructions, data, or the like to each unit configuring the image processing apparatus 1 based on image data acquired by the image acquiring unit 11, an input signal input from the input unit 12, a program or data recorded in the recording unit 14, and the like.

Figure 2:
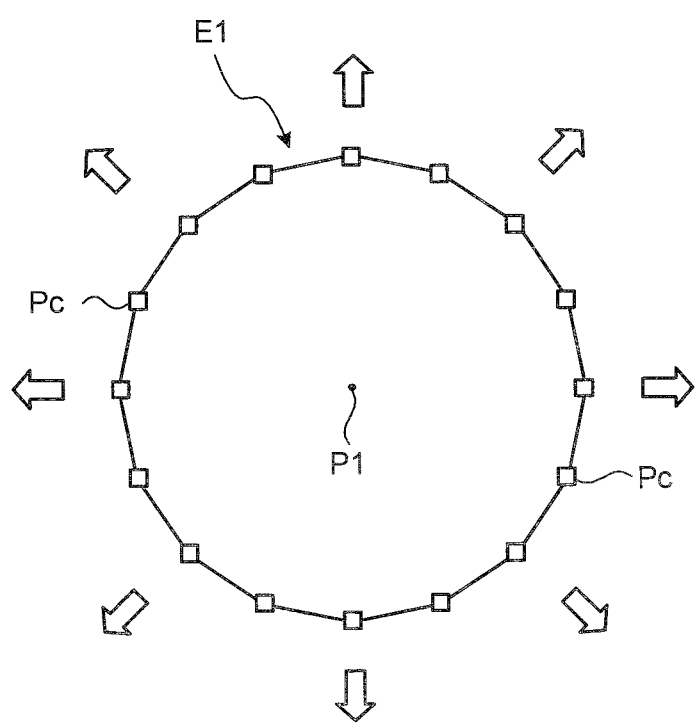
FIG. 2 is a diagram illustrating the principle of extracting a closed region.

Here, the principle of extracting a closed region will be described which is performed by the closed region extracting unit 22 according to the first embodiment. FIG. 2 is a diagram illustrating the principle of extracting a closed region and schematically illustrates an initial closed region E1 that is set by the initial closed region setting unit 23 of the closed region extracting unit 22. As illustrated in FIG. 2, the initial closed region E1 is set by arranging a plurality of control points Pc on pixels located on the boundary and joining the control points Pc. The number of the control points Pc to be arranged is determined based on the size of the initial closed region. The internal energy, the image energy, and the external energy described above are calculated for each control point Pc based on the position of each control point Pc, the gradient strength at the position, a distance from the center of gravity (center) P1 to each control point Pc, and the like, and the control points Pc are moved so as to minimize a weighted sum of the three energies. Accordingly, the initial closed region E1 is transformed in the direction extending the area, whereby a closed region is extracted.

When the closed region is extracted as above, an abnormal portion located on the inside of the closed region is detected. In this example, as will be described in detail later, an abnormal portion is detected by performing a morphology process, for example, a three-dimensional morphology process (shading morphology) using a structure element having a spherical shape. Here, as the morphology process, there are an opening process (reference: "Digital Image Processing", CG-ARTS Society, P 179 to P 180, *Expansion and Contraction Process*)

and a closing process (reference: "Digital Image Processing", CG-ARTS Society, P 179 to P 180, *Expansion and Contraction Process*). The opening process is a process of calculating a locus (surface) through which a maximum value of the outer periphery of a structure element passes when a reference diagram (having a spherical shape in this example) called the structure element is moved while being circumscribed about a target area from a side (lower side) of the target area on which the pixel value is relatively small in a three-dimensional space in which the pixel value is regarded as elevation. On the other hand, the closing process is a process of calculating a locus through which a minimum value of the outer periphery of a structure element passes when the structure element is moved while being circumscribed about the target area from a side (upper side) on which the pixel value is relative large in a similar three-dimensional space. In a case where the opening process is used, a value on the acquired locus is used as a reference value, and a pixel having a large difference from the actual pixel value is detected as an abnormal portion. In addition, in a case where the closing process is used, similarly, a pixel having a large difference between a reference value on the acquired locus and the actual pixel value is detected as an abnormal portion.

Figure 3:
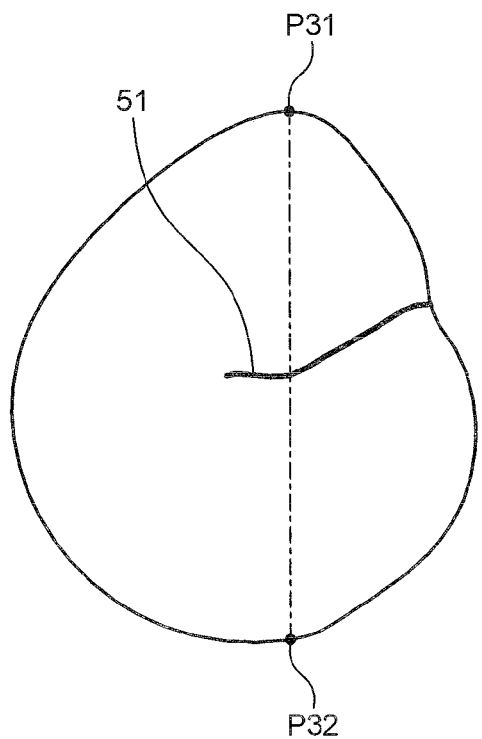
FIG. 3 is a diagram illustrating a closed region that includes an edge such as a groove position on the inside thereof.
Figure 4:
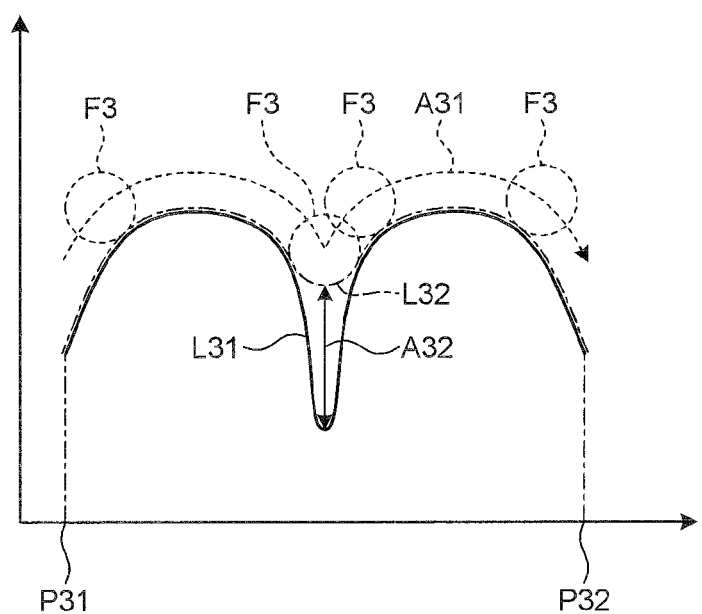
FIG. 4 is a diagram illustrating a change curve of pixel values on a line denoted by a dashed-dotted line in FIG. 3.

However, in a case where an abnormal portion is detected for each closed region by applying a morphology process including the opening process or the closing process described above, when the groove position is included inside the closed region, the groove position may be incorrectly detected as an abnormal portion. FIG. 3 is a schematic diagram illustrating an example of the closed region and illustrates the closed region that is generated so as to include an edge 51 such as a groove position on the inside thereof. FIG. 4 illustrates a change curve L31 of pixel values with the horizontal axis representing a pixel position between boundary pixels P31 and P32 on a line (a line straddling the edge 51) denoted by a dashed-dotted line in FIG. 3 and the vertical axis representing the pixel value of each pixel. On the line straddling the edge 51, as illustrated in FIG. 4, the change in the pixel value at the edge position locally represents a largely-depressed portion. Accordingly, a morphology process (the closing process) is performed for the closed region including the edge 51 therein. When the structure element F3 is moved while being circumscribed about the area from the upper side (arrow A31), if the structure element F3 is larger than the width of the above-described depressed portion, the structure element F3 does not get into the portion, and accordingly, a locus L32 (actually, a surface) as denoted by a dashed-dotted line illustrated in FIG. 4 can be acquired. As above, in a case where the edge 51 such as a groove position is included inside the closed region, the acquired reference value largely deviates from the actual pixel value depending on the shape of the structure element F3. As described above, in the detection of an abnormal portion, a value on the acquired locus L32 is used as a reference value, the pixel value of each pixel is compared with the reference value, and a pixel having a large difference is detected as the abnormal portion. Accordingly, in a case where a closed region including an edge such as a groove position inside the closed region is generated, the portion of the edge 51 may be incorrectly detected as an abnormal portion due to a difference denoted by arrow A32.

Figure 5:
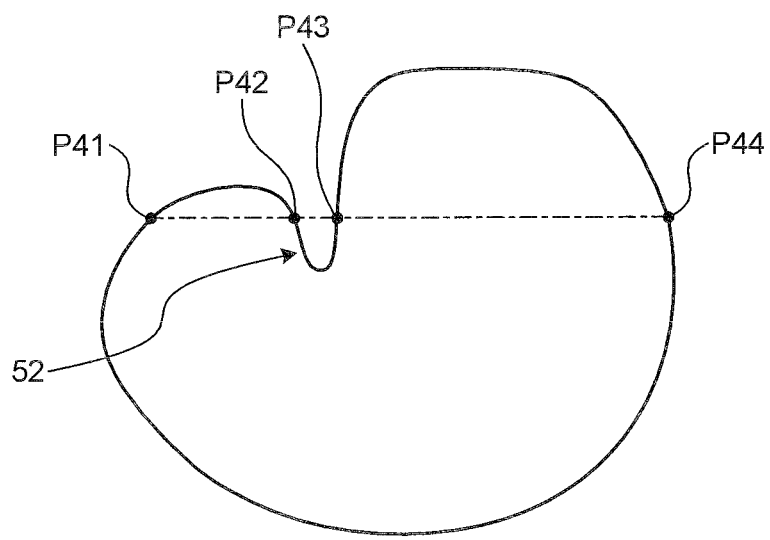
FIG. 5 is a diagram illustrating a closed region that includes an edge largely bending such as a contour portion on the boundary.
Figure 6:
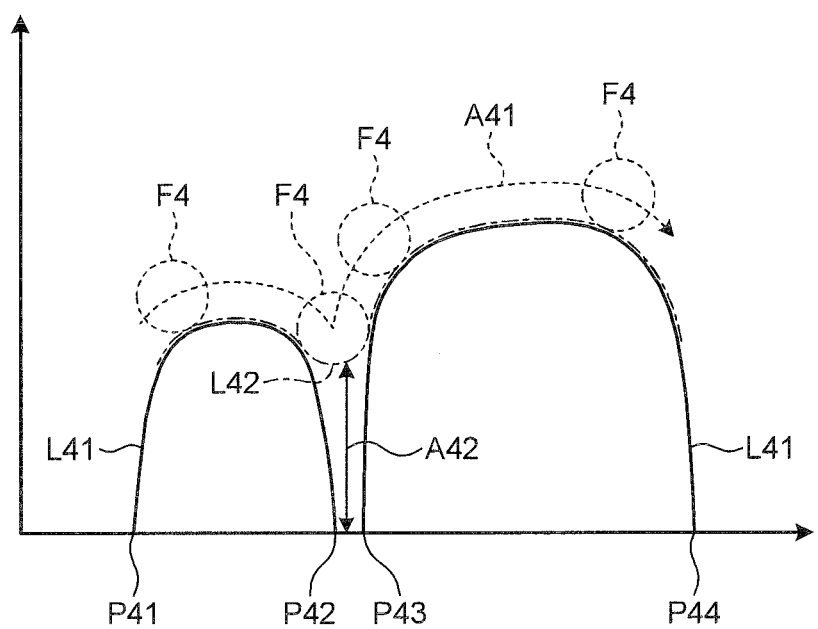
FIG. 6 is a diagram illustrating a change curve of pixel values on a line denoted by a dashed-dotted line in FIG. 5.

Similarly, in a case where a contour portion that bends to the inner side with predetermined curvature or more is included in the boundary of the closed region, the contour portion may be incorrectly detected as an abnormal portion. FIG. 5 is a schematic diagram illustrating another example of a closed region and illustrates the closed region generated so as to include an edge 52, which bends toward the inner side with predetermined curvature or more, such as a contour portion on the boundary thereof. FIG. 6 illustrates a change curve L41 of pixel values with the horizontal axis representing a pixel position between boundary pixels P41 and P44 located on a line (a line straddling a bending portion of the edge 52) denoted by a dashed-dotted line in FIG. 5 and the vertical axis representing the pixel value of each pixel between boundary pixels P41 and P42 and boundary pixels P43 and P44 that are located on the inside of the closed region. On a line straddling the bending portion of the edge 52, as illustrated in FIG. 6, the change in the pixel value is stopped at the bending portion. Here, when a structure element F4 is moved while being circumscribed about the closed region including the edge 52, of which the boundary largely bends to the inner side, from the upper side by performing the morphology process (closing process) for the closed region (arrow A41), in a case where the structure element F4 is larger than a gap of the portion in which the change in the pixel value stops, the structure element F4 does not get into this portion, and thereby a locus L42 (actually, a surface) as denoted by a dashed-dotted line in FIG. 6 is acquired. As above, in a case where the boundary of the closed region includes an edge such as a contour portion that largely bends toward the inner side, similarly to a case where an edge such as a groove position is included on the inside of the closed region, a reference value acquired depending on the shape of the structure element largely deviates from the actual pixel value, and a contour portion may be incorrectly detected as an abnormal portion due to a difference denoted by arrow A42.

In order to suppress the above-described situation, according to the first embodiment, the closed region extracting unit 22 extracts a closed region that satisfies the conditions that a pixel (a pixel located in the edge portion) having gradient strength that is a predetermined value or more is not included on the inside of the region, and the boundary of the region does not bend toward the inner side with predetermined curvature or more. Accordingly, in the detection of an abnormal portion that is performed by applying the morphology process on the latter stage, a reference value can be appropriately acquired.

Figure 7:
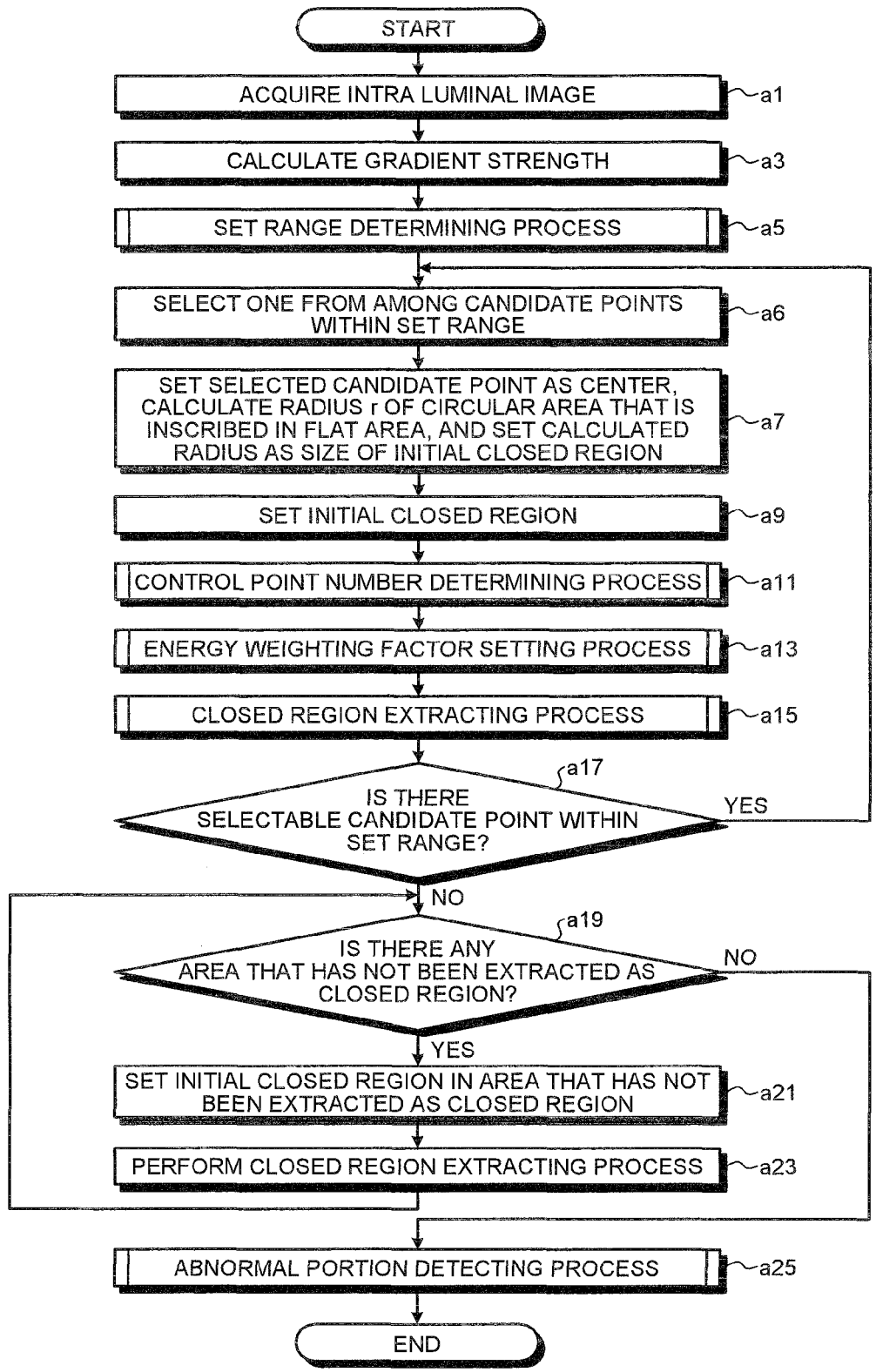
FIG. 7 is the entire flowchart illustrating the processing sequence performed by the image processing apparatus according to the first embodiment.

Next, the detailed processing sequence performed by the image processing apparatus 1 according to the first embodiment will be described. FIG. 7 is the entire flowchart illustrating the processing sequence performed by the image processing apparatus 1 according to the first embodiment. The process described here is realized by executing the image processing program 141 recorded in the recording unit 14 by using the calculating unit 20.

Figure 8:
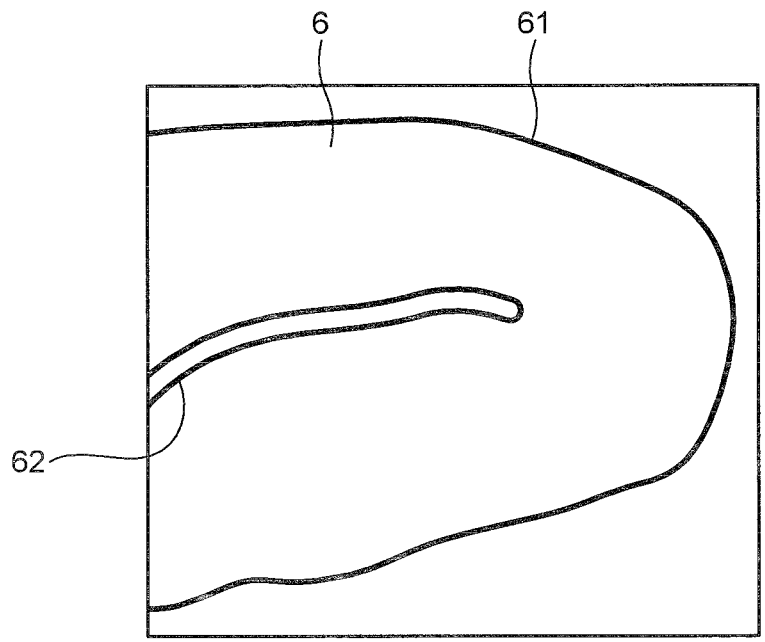
FIG. 8 is a schematic diagram illustrating an example of an intraluminal image.

As illustrated in FIG. 7, first, the calculation unit 20 acquires an intraluminal image as a processing target (Step a1). Through this process performed here, the calculation unit 20 acquires the intraluminal image as a processing target that is acquired by the image acquiring unit 11 and is recorded in the recording unit 14 by reading it out. FIG. 8 is a schematic diagram illustrating an example of the intraluminal image. As illustrated in FIG. 8, on the intraluminal image, basically, a body tissue such as a mucous membrane 6 of an inner wall of a gastrointestinal track is reflected, and an abnormal area (not shown in the figure) such as a bleeding site is reflected in some cases. In addition, in the intraluminal image, a groove that is generated due to a folding, an undulation, or the like of the mucous membrane 6, the contour of the mucous membrane 6, and the like appear as edges 61 and 62. In FIG. 8, one edge 62 is represented as an edge that largely bends.

Subsequently, the gradient strength calculating unit 21 calculates the gradient strength of each pixel, for example, based on G values of pixels of the intraluminal image (Step a3). This can be realized by applying a known edge extracting process (reference: "Digital Image Processing", CG-ARTS Society, P 114 to P 121, *Edge Extraction*) using a first-order differential filter such as a Sobel filter or a second-order differential filter such as a Laplacian filter or the like. The reason for using the G value is that the wavelength band thereof is near the absorption wavelength band of hemoglobin, and the sensitivity can be easily acquired, thereby representing the structure of the intraluminal image well. Here, although the gradient strength is calculated based on the G value of each pixel, the luminance value of each pixel may be calculated, and the gradient strength of each pixel is calculated based on the luminance values.

Figure 9:
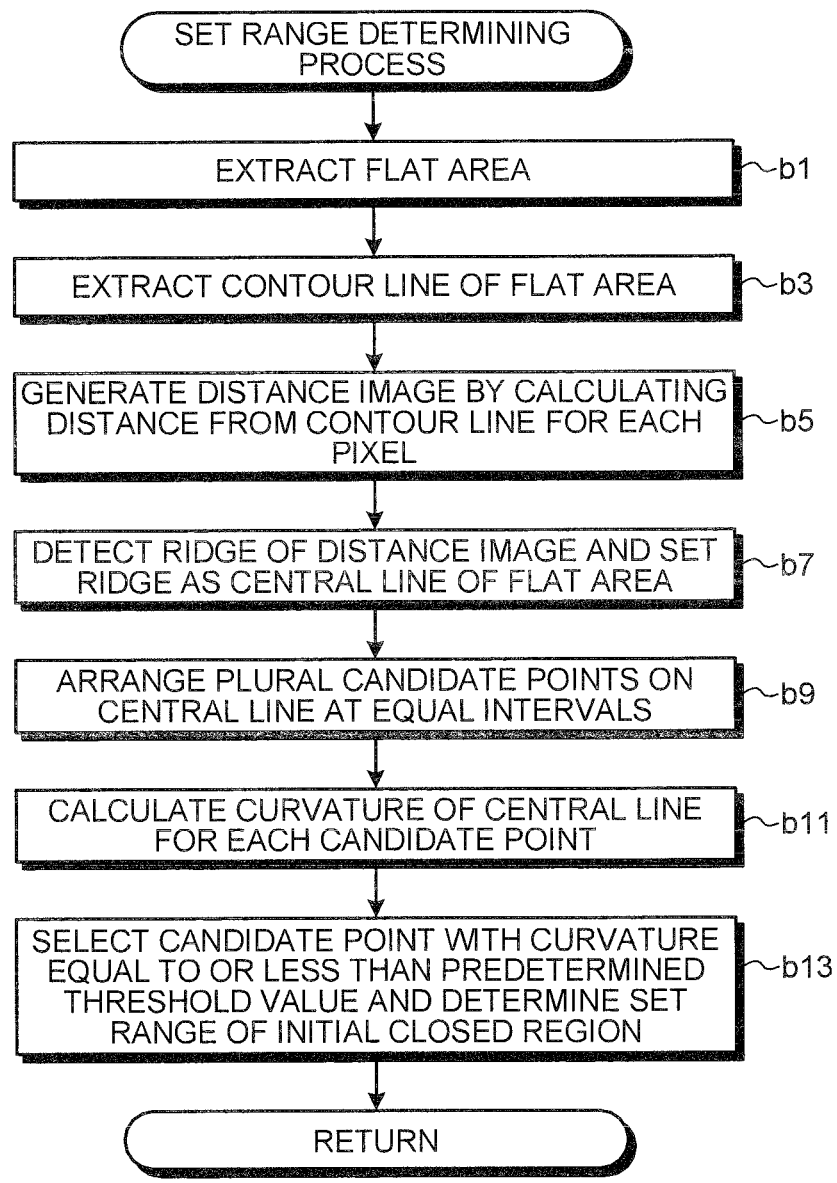
FIG. 9 is a flowchart illustrating the detailed processing sequence of a set range determining process according to the first embodiment.

Subsequently, the range determining unit 24 performs a set range determining process (Step a5). FIG. 9 is a flowchart illustrating the detailed processing sequence of the set range determining process according to the first embodiment.

As illustrated in FIG. 9, in the set range determining process, first, the flat area extracting unit 241 extracts an area of which the value of the gradient strength is small to some degree, for example, the value of the gradient strength is a threshold value set in advance or less from the intraluminal image as a processing target as a flat area based on the gradient strength calculated for each pixel in Step a3 illustrated in FIG. 7 in Step b1. This can be realized by applying, for example, a known area integration method (reference: "Digital Image Processing", CG-ARTS Society, P 196, *Area Dividing Process*) or the like. Here, although an area of which the value of the gradient strength is the predetermined threshold value or less is extracted as a flat area, a flat area may be extracted in consideration of a color (pixel value) as well. Described in more detail, an area made up of a plurality of pixels which have some small degree of values of the gradient strength (the values of the gradient strength are the predetermined threshold value or less) close to those of the pixels located on the periphery thereof may be extracted as a flat area based on the value of the gradient strength calculated for each pixel in Step a3 illustrated in FIG. 7 and the pixel values of the intraluminal image as a processing target.

Subsequently, the central line calculating unit 243, first, extracts the contour line of the flat area as a process of calculating the central line of the flat area, which is extracted in Step b1 (Step b3). This, for example, may be realized by applying a known contour tracking method (reference: "Digital Image Processing", CG-ARTS Society, P 178 to P 179, *Contour Tracking*) or the like.

Figure 10:
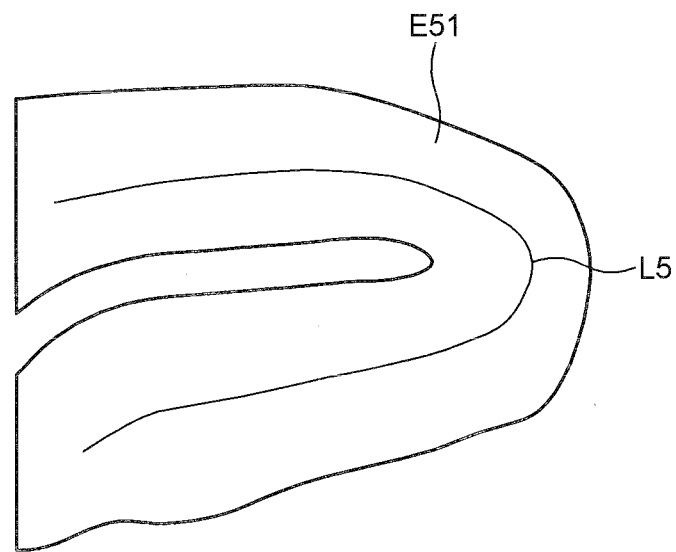
FIG. 10 is a schematic diagram illustrating a flat area that is extracted from the intraluminal image illustrated in FIG. 8.

Subsequently, the central line calculating unit 243 calculates a distance from the contour line extracted in Step b3 for each pixel and generates a distance image by setting the pixel value of each pixel to the value of the distance calculated for the pixel (Step b5). Then, the central line calculating unit 243 detects a ridge of the distance image and sets the ridge as the central line of the flat area (Step b7). For example, this can be realized by applying a skeleton extracting process. FIG. 10 is a schematic diagram illustrating one of flat areas that are extracted from the intraluminal image illustrated in FIG. 8 and represents a flat area E51 that is a portion interposed between the edges 61 and 62 illustrated in FIG. 8. In Step b7 illustrated in FIG. 9, a central line L5 is acquired from the flat area E51 illustrated in FIG. 10.

Figure 11:
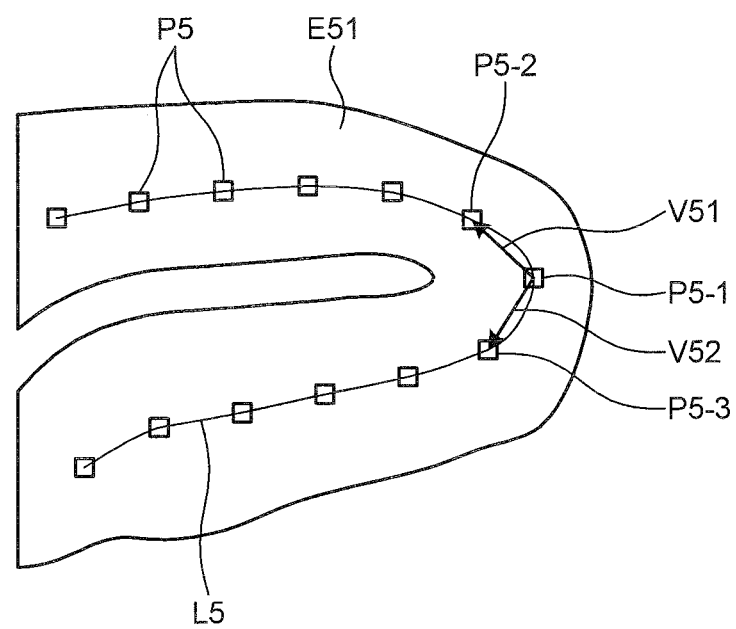
FIG. 11 is a diagram illustrating candidate points arranged on a central line of the flat area illustrated in FIG. 10.

Subsequently, the curvature calculating unit 244 calculates the curvature of the central line, which is calculated in Step b7, as the shape information of the flat area. In other words, first, the curvature calculating unit 244 arranges a plurality of candidate points on the central line so as to be equally spaced (Step b9). Subsequently, the curvature calculating unit 244 calculates an inner product of two adjacent candidate points for each candidate point arranged in Step b9 and sets the inner product as the curvature of the central line at the corresponding candidate point (Step b11). FIG. 11 is a diagram illustrating candidate points P5 arranged on a central line L5 of the flat area E51 illustrated in FIG. 10. Here, for example, when a candidate point P5-1 out of the candidate points P5 is a candidate point of interest, in Step b11 illustrated in FIG. 9, an inner product of vectors V51 and V52 that face toward candidate points P5-2 and P5-3 is calculated and sets the inner product as the value of the curvature of the central line L5 at the candidate point P5-1.

Subsequently, the range determining unit 24 performs threshold value processing for the curvature calculated for each candidate point in Step b11. Then, the range determining unit 24 selects candidate points at which the curvature is a threshold value set in advance or less and determines the range of the selected candidate points as a set range of the initial closed region inside the flat area (Step b13). At the position of the candidate point at which the value of the curvature acquired in Step b11 is large, that is, the position at which the central line largely bends, there is a high possibility that there is an end point of an edge or an edge that largely bends on the outer side of the flat area near the candidate point. For example, while the curvature of the central line L5 at the candidate point P5-1 illustrated in FIG. 11 is acquired as a value larger than those of other candidate points, on the inner side of the flat area E51 near this candidate point P5-1, an edge 62 that largely bends is presented as illustrated in FIG. 8. In Step b13 illustrated in FIG. 9, candidate points (candidate points at which the values of the curvature are small) other than a candidate point such as this candidate point P5-1 at which the value of the curvature is large are selected, and the range of the selected candidate points P5 is set as the set range of the initial closed region. For example, in the example illustrated in FIG. 11, all the candidate points P5 except for the candidate point P5-1 are selected, and the range of the selected candidate points P5 is set as the set range of the initial closed region.

In addition, in a case where there is a plurality of flat areas detected in Step b1, the process of Steps b3 to b13 is performed for each flat area, and the set range of the initial closed region is determined for each flat area. When the set range of the initial closed region is determined for each flat area, the process is returned to Step a5 illustrated in FIG. 7 and thereafter proceeds to Step a6.

In Step a6, the inscription area size determining unit 271 selects one candidate point from among candidate points within the set range that is determined in Step b13 illustrated in FIG. 9. For example, a candidate point having a largest pixel value in the distance image is selected based on the pixel value of each candidate point (pixel) within the set range in the distance image that is generated in Step b5 illustrated in FIG. 9. Alternatively, a candidate point may be randomly selected from among candidate points within the set range.

Figure 12:
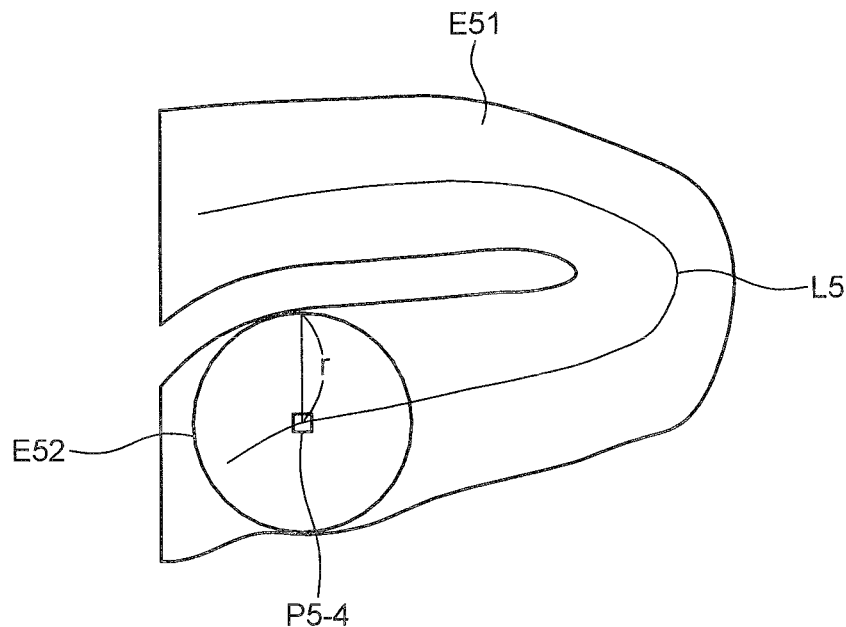
FIG. 12 is a diagram illustrating an example of an initial closed region set in a set range within the flat area.

Subsequently, the inscription area size determining unit 271 calculates the radius r of a circular area that is a circular area having the position of the candidate point selected in Step a6 as its center position and is inscribed in the contour line of the flat area and sets the radius r as the size of the initial closed region (Step a7). Then, the initial closed region setting unit 23 sets a circular area of the radius r that has the position of the candidate point selected in Step a6 as its center position and is inscribed in the contour line of the flat area calculated for the corresponding center position in Step a7 as the initial closed region (Step a9). FIG. 12 is a diagram illustrating an initial closed region E52 that is set as the circular area of the radius r for one candidate point P5-4 that is selected from the range of the candidate points determined as the set range from the candidate points P5 illustrated in FIG. 11.

Figure 13:
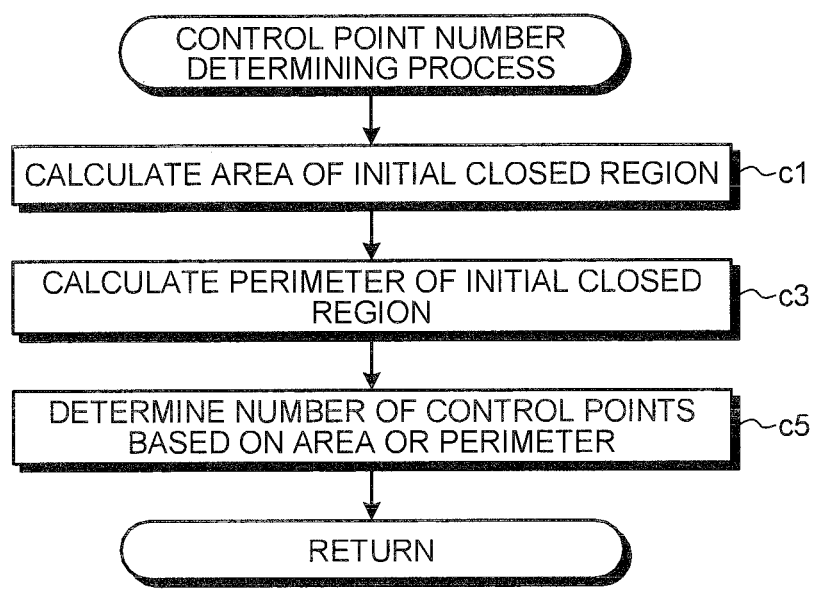
FIG. 13 is a flowchart illustrating the detailed processing sequence of a control point number determining process.

When the initial close region (the initial shape of the closed region) is set within the set range as described above, subsequently, the control point number determining unit 28 determines the number of control points of the initial closed region by performing a control point number determining process (Step a11). FIG. 13 is a flowchart illustrating the detailed processing sequence of the control point number determining process.

As illustrated in FIG. 13, in the control point number determining process, first, the area calculating unit 281 calculates the area of the initial closed region (Step c1). Subsequently, the perimeter calculating unit 282 calculates the perimeter of the initial closed region (Step c3). Then, the control point number determining unit 28 determines the number of control points of the initial closed region based on the area or the perimeter (Step c5). For example, as the area is larger or the perimeter is longer, the larger number of control points is set, in accordance with the following Equation (1).

Number of Control Points=Area or Perimeter/Predetermined Coefficient (1)

Although the number of control points is set based on the area or the perimeter here, the number of control points may be determined by using both the area and the perimeter. In a case where the number of control points is set based on the area, the process of Step c3 may not be performed. Similarly, in a case where the number of control points is set based on the perimeter, the process of Step c1 may not be performed. When the number of control points is determined, the process is returned to Step a11 illustrated in FIG. 7 and then proceeds to Step a13.

Figure 14:
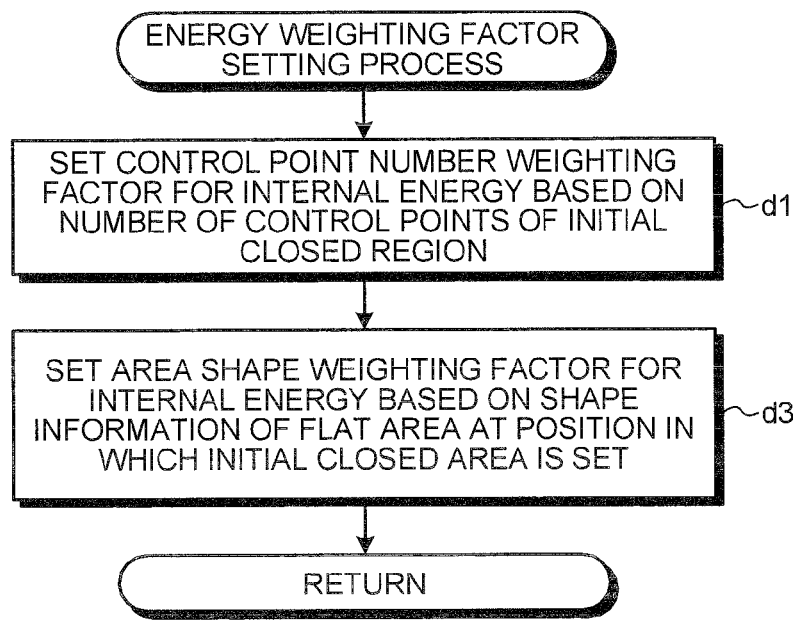
FIG. 14 is a flowchart illustrating the detailed processing sequence of an energy weighing factor setting process according to the first embodiment.

Then, in Step a13, the energy weighting factor setting unit 29 sets a control point number weighting factor and an area shape weighting factor of the initial closed region by performing an energy weighting factor setting process. FIG. 14 is a flowchart illustrating the detailed processing sequence of an energy weighing factor setting process according to the first embodiment.

As illustrated in FIG. 14, in the energy weighting factor setting process, first, the control point number weighting factor setting unit 291 sets the control point number weighting factor for the internal energy based on the number of control points of the initial closed region (Step d1). As described above with reference to FIG. 2, the initial closed region is set by joining a plurality of control points. Accordingly, as the number of control points is increased, a smoother curve is formed, and the internal energy representing the smoothness of the boundary of the closed region has a smaller value. Thus, in order to maintain the ratio of the internal energy for each closed region to be constant, the control point number weighting factor for the internal energy is set so as to be increased as the number of control points is increased, in accordance with the following Equation (2).

Control Point Number Weighting Factor=Number of Control Points×Predetermined Coefficient (2)

Subsequently, the area shape weighting factor setting unit 292 sets an area shape weighting factor for the internal energy based on the shape information (the curvature of the central line that is calculated in Step b11 illustrated in FIG. 9 for the candidate point as the center position) of the flat area at the center position of the initial closed region (Step d3). As described above, in a case where the curvature of the central line at the center position of the initial closed region is large, there is a high possibility that an end point of an edge or an edge that largely bends is present on the outer side of the flat area located on the periphery thereof. In Step d3, in order not to extract a closed region into which such an end point of an edge gets or a closed region having a boundary including an edge that largely bends, the area shape weighting factor for the internal energy is set so as to have a larger value as the shape information (the curvature of the central line at the candidate point as the center position) of the flat area becomes larger in accordance with the following Equation (3).

Area Shape Weighting Factor=Curvature of Central Line at Candidate Point as Center Position×Predetermined Coefficient (3)

Figure 15:
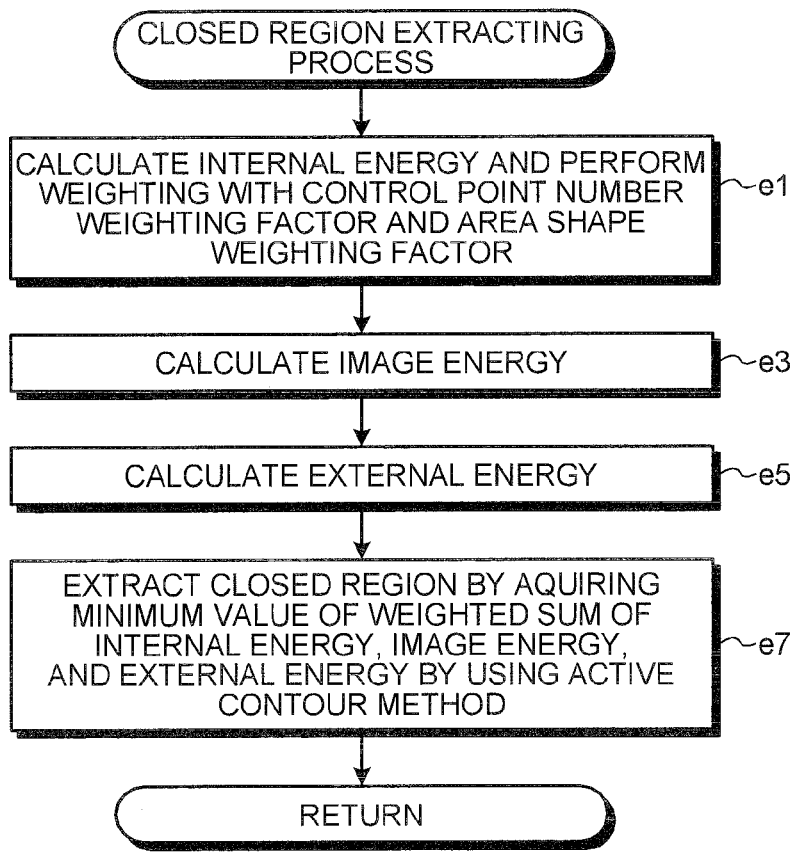
FIG. 15 is a flowchart illustrating the detailed processing sequence of a closed region extracting process.

When the control point number weighing factor and the area shape weighting factor are set, the process is returned to Step a13 illustrated in FIG. 7 and proceeds to a closed region extracting process of Step a15. FIG. 15 is a flowchart illustrating the detailed processing sequence of the closed region extracting process.

As illustrated in FIG. 15, in the closed region extracting process, first, the internal energy calculating unit 301 calculates internal energy ($E_{internal}$) for each control point of the initial closed region (Step e1), which represents a smaller value as the boundary of the closed region is smoother. For example, the energy E is calculated based on an inner product of vectors between two control points ($x_{i-1}$, $y_{i-1}$) and ($x_{i+1}$, $y_{i+1}$) adjacent to a control point ($x_i$, $y_i$) of interest in accordance with the following Equation (4). Then, the value of the acquired energy E is weighted by the control point number weighting factor and the area shape weighting factor, which are set in the energy weighting factor setting process illustrated in FIG. 14, so as to be set as the value of the internal energy $E_{internal}$. This internal energy $E_{internal}$ limits the control point of interest so as not to bend toward the inner side of the closed region with predetermined curvature or more with respect to the positions of the adjacent control points.

$$E(i) = \frac{(x_{i-1} - x_i) \times (x_{i+1} - x_i) + (y_{i-1} - y_i) \times (y_{i+1} - y_i)}{\sqrt{(x_{i-1} - x_i) \times (x_{i-1} - x_i) + (y_{i-1} - y_i)(y_{i-1} - y_i)} \times \sqrt{(x_{i+1} - x_i) \times (x_{i+1} - x_i) + (y_{i+1} - y_i)(y_{i+1} - y_i)}} \quad (4)$$

Subsequently, the image energy calculating unit 302 calculates image energy ($E_{image}$) for each control point of the initial closed region in Step e3, which represents a smaller value as the gradient strength of the boundary of the closed region is higher. For example, the image energy $E_{image}$ is represented by the following Equation (5) and is calculated as a reciprocal of the gradient strength of a pixel located at the position of the control point of interest.

$$E_{image}(i) = \beta \frac{1}{\nabla S_{(i)}} \quad (5)$$

Here, $\nabla S_{(i)}$ is the value of the gradient strength on the coordinates of the control point (i).

The external energy calculating unit 303 calculates external energy ($E_{external}$) for each control point of the initial closed region in Step e5, which represents a smaller value as the size of the closed region is larger. The external energy $E_{external}$ is energy at the control point of interest toward the direction in which the closed region extends, for example, is represented by the following Equation (6), and is calculated as a reciprocal of a distance between the center of the closed region and the control point of interest.

$$E_{external}(i) = \gamma \frac{1}{l_i} \quad (6)$$

$$l_i = \sqrt{(x_i - x_c)^2 + (y_i - y_c)^2}$$

$$\text{where, } (x_c, y_c) = \left( \frac{\sum_{i=1}^{N} x_i}{N}, \frac{\sum_{i=1}^{N} y_i}{N} \right).$$

In addition, $\beta$ represented in Equation (5) and $\gamma$ represented in Equation (6) represent weighting factors of corresponding energy, and the values thereof may be determined based on an experimental rule. Each value of $\beta$ or $\gamma$ may be a fixed value or may be changed, for example, in accordance with a user operation input or the like.

The energy weighted-sum calculating unit 31 extracts a closed region by acquiring a minimum value of the weighted sum of the internal energy, the image energy, and the external energy by using an active contour extraction method (reference: "Digital Image Processing", CG-ARTS Society, P 196 to P 200, *Area Dividing Process*) (Step e7).

Described in more detail, a weighted sum of the energies is calculated for each control point as described above and is calculated as a sum of weighted values of three energies of the internal energy $E_{internal}$ acquired by weighing using the control point number weighting factor and the area shape weighting factor, the image energy $E_{image}$ calculated for each control point, and the external energy $E_{external}$ calculated for each control point, and the calculation equation is represented in the following Equation (7).

$$E = \int_{1}^{N} (E_{internal}(i) + E_{image}(i) + E_{external}(i)) di \quad (7)$$

where N denotes the number of control points. In Step e7, a closed region is extracted by transforming the initial closed region so as to minimize the weighted sum. When the closed region is extracted, the process is returned to Step a15 illustrated in FIG. 7 and thereafter proceeds to Step a17.

Then, in Step a17, the initial closed region setting unit 23 determines whether or not there is a selectable candidate point within the set range. For example, a candidate point of which the position is located outside the closed region that has been already extracted is set as a selectable candidate point from among candidate points within the set range, and it is determined whether or not there is such a selectable candidate point. Accordingly, a candidate point that is included inside a closed region that has been already extracted is not selected. The determination here is a determination of whether or not the position of the candidate point is outside the closed region that has been already extracted, and the initial closed region having the position of the candidate point as its center position may overlap a closed region that has been already extracted. In a case where there is such a selectable candidate point (Yes in Step a17), the process is returned to Step a6, and the inscription area size determining unit 271 selects a candidate point, for example, that has a largest pixel value in the distance image from among selectable candidate points. Thereafter, the process of Step a7 and after that is performed for the selected candidate point.

On the other hand, in a case where there is no selectable candidate point within the set range (No in Step a17), subsequently, the closed region extracting unit 22 determines whether or not there is an area that has not been extracted as the closed region. In a case where there is an area that has not been extracted as a closed region (Yes in Step a19), the closed region extracting unit 22 sets an initial closed region in the area that has not been extracted as the closed region (Step a21). The setting of the initial closed region here may set an initial closed region, for example, having a circular shape so as to include only an area that has not been extracted as a closed region. However, the initial closed region is set such that the center position thereof is not included inside the closed region that has been already extracted and the initial closed region does not include a pixel located at the edge position (a pixel having a large gradient strength value). Then, the closed region extracting unit 22 performs the closed region extracting process for the set initial closed region (Step a23). Although this closed region extracting process may be performed in the approximately same sequence as that of the closed region extracting process illustrated in FIG. 15, the control point number weighting and the area shape weighting for the internal energy are not performed in the process here.

Thereafter, the process is returned to Step a19, and the above-described process is repeated until it is determined that the entire area (excluding the edge position) inside the intraluminal image is extracted as a closed region. Then, in a case where it is determined that there is no area extracted as the closed region (No in Step a19), the abnormal portion detecting unit 32 performs an abnormal portion detecting process (Step a25). In the first embodiment, for example, a method is used in which an abnormal portion is detected by performing a known opening process for a closed image for which a known closing process has been performed and performing threshold value processing for a difference between an acquired pixel value (reference value) and the original pixel value.

Figure 16:
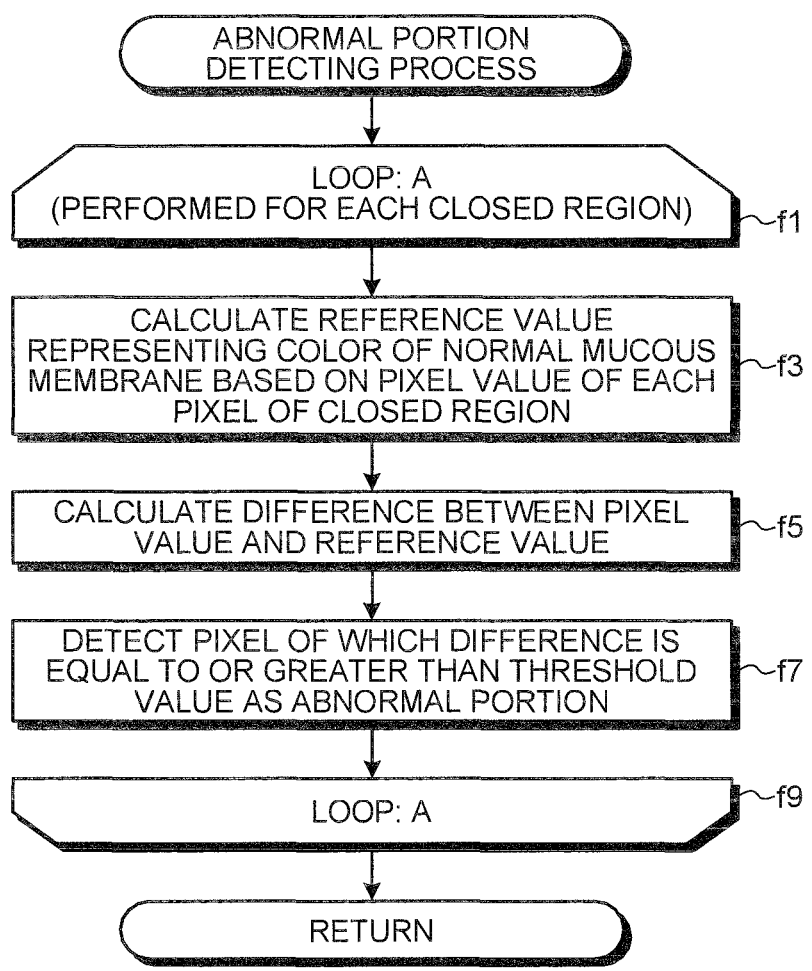
FIG. 16 is a flowchart illustrating the detailed processing sequence of an abnormal portion detecting process.

FIG. 16 is a flowchart illustrating the detailed processing sequence of an abnormal portion detecting process. As illustrated in FIG. 16, in the abnormal portion detecting process, the abnormal portion detecting unit 32 performs the process of loop A for each closed region (Steps f1 to f9). In this loop A, the abnormal portion detecting unit 32, first, calculates a reference value for each pixel of the closed region as a processing target (Step f3). Subsequently, the abnormal portion detecting unit 32 calculates a difference between the pixel value of each pixel of the closed region as the processing target and the reference value calculated in Step f3 (Step f5). Then, the abnormal portion detecting unit 32 performs threshold value processing for the difference and detects a pixel for which the difference is a threshold value set in advance or more as an abnormal portion (Step f7). When the process of loop A has been performed for all the closed regions, the process is returned to Step a25 illustrated in FIG. 7, and thereafter the process ends. In addition, a result of the abnormal portion detecting process (a result of the detection of an abnormal portion in Step f7) illustrated in FIG. 16 is output to the display unit 13, and, for example, the abnormal portion inside the intraluminal image is represented and displayed so as to be identifiable from the other areas and is presented to a user such as a medical doctor.

As described above, according to the first embodiment, a flat area is extracted from an intraluminal image, and an initial closed region is set in the set range that is determined within the flat area. Accordingly, an initial closed region that does not include any edge on the inside thereof can be set. In addition, at this time, the curvature of the central line is calculated as the shape information of the flat area, and a range on the central line excluding a position at which the curvature of the central line is high and an end portion of an edge or an edge that largely bends may be presented on the outer side with a high possibility is determined as the set range. A closed region is extracted by using an active contour extraction method while weighting the internal energy representing the degree of smoothness of the boundary of the closed region by the control point number weighting factor, which is set to be larger as the number of control points is larger, and the area shape weighing factor, of which the value is larger as the curvature at the position on the central line set as the center, position of the initial closed region is higher.

As described above, since the closed region is extracted by transforming the initial closed region in a direction extending the area, in a case where an end point of an edge or an edge that largely bends is present outside the initial closed region, the edge may get into the inside of the closed region or the boundary of the closed region is extended along the edge in the process of transforming the initial closed region so as to extract a closed region of which the boundary includes an edge that largely bends. According to the first embodiment, by setting the positions at which the bending on the central line is small inside the flat area as the set range, the initial closed region can be so as not to be set at a position at which the bending on the central line is large. In addition, together with setting the initial closed region with a position at which the bending is small on the central line used as the center position, the weighting of the internal energy can be performed in accordance with the curvature of the central line at a position on the central line set as the center position (weighting by the area shape weighing factor). By extending the initial closed region for which the position and the weighting are set, a closed region can be extracted such that a groove position reflected on the intraluminal image is not included on the inside thereof, and the boundary thereof does not include the contour portion. Accordingly, by applying the morphology process for each closed region, an abnormal portion located inside the closed region can be detected. Therefore, an abnormal portion can be detected with high accuracy from the intraluminal image without incorrectly detecting a groove position or a contour potion as the abnormal portion.

In addition, according to the first embodiment, the position of a selected candidate point is set as the center position, and a circular area of a radius r that is inscribed in the contour line of the flat area is set as the initial closed region. In addition, in Step a21 illustrated in FIG. 7, the initial closed region, for example, having a circular shape is set so as to include an area that is not extracted as a closed region. On the other hand, a radius r of a circular area set as the initial closed region may be calculated based on the pixel value of the selected candidate point in the distance image so as to be set as the size of the initial closed region. Furthermore, in Step a21 illustrated in FIG. 7, a radius r of the circular area may be calculated based on the pixel value at the center position of the initial closed region to be set in the distance image. Described in more detail, a radius r is calculated by using the following Equation (8). Alternatively, the radius r may be calculated by using the following Equation (9). In Equations (8) and (9), the position of the origin point is the position of the candidate point or the center position of the initial closed region set in Step a21 illustrated in FIG. 7. In addition, the value of the distance image is a pixel value at the position of the origin point in the distance image.

Radius $r$=Value of Distance Image at Position of Origin Point×Predetermined Coefficient (8)

Radius $r$=Value of Distance Image at Position of Origin Point−Predetermined Value (9)

In addition, in the first embodiment, as the weighting factors for the internal image, although two types of weighting factors (the control point number weighing factor and the area shape weighting factor) are set, any one of the weighting factors may be set. In a case where only the area shape weighting factor is set, the number of control points set in the initial closed region may be fixed.

Furthermore, the functional configuration illustrated in FIG. 1 is merely an example, and the functional configuration is not limited thereto. The range determining unit 24 is configured so as to include the flat area extracting unit 241 and the area shape information calculating unit 242 as illustrated in FIG. 1. However, for example, in a case where the calculation unit 20 can calculate the shape information of the flat area, the range determining unit 24 can determine the set range based on the shape information of the flat area, and the area shape weighting factor setting unit 292 of the energy weighting factor setting unit 29 can set the area shape weighting factor based on the shape information of the flat area, the configuration is not limited to a configuration including the range determining unit 24.

Second Embodiment

Figure 17:
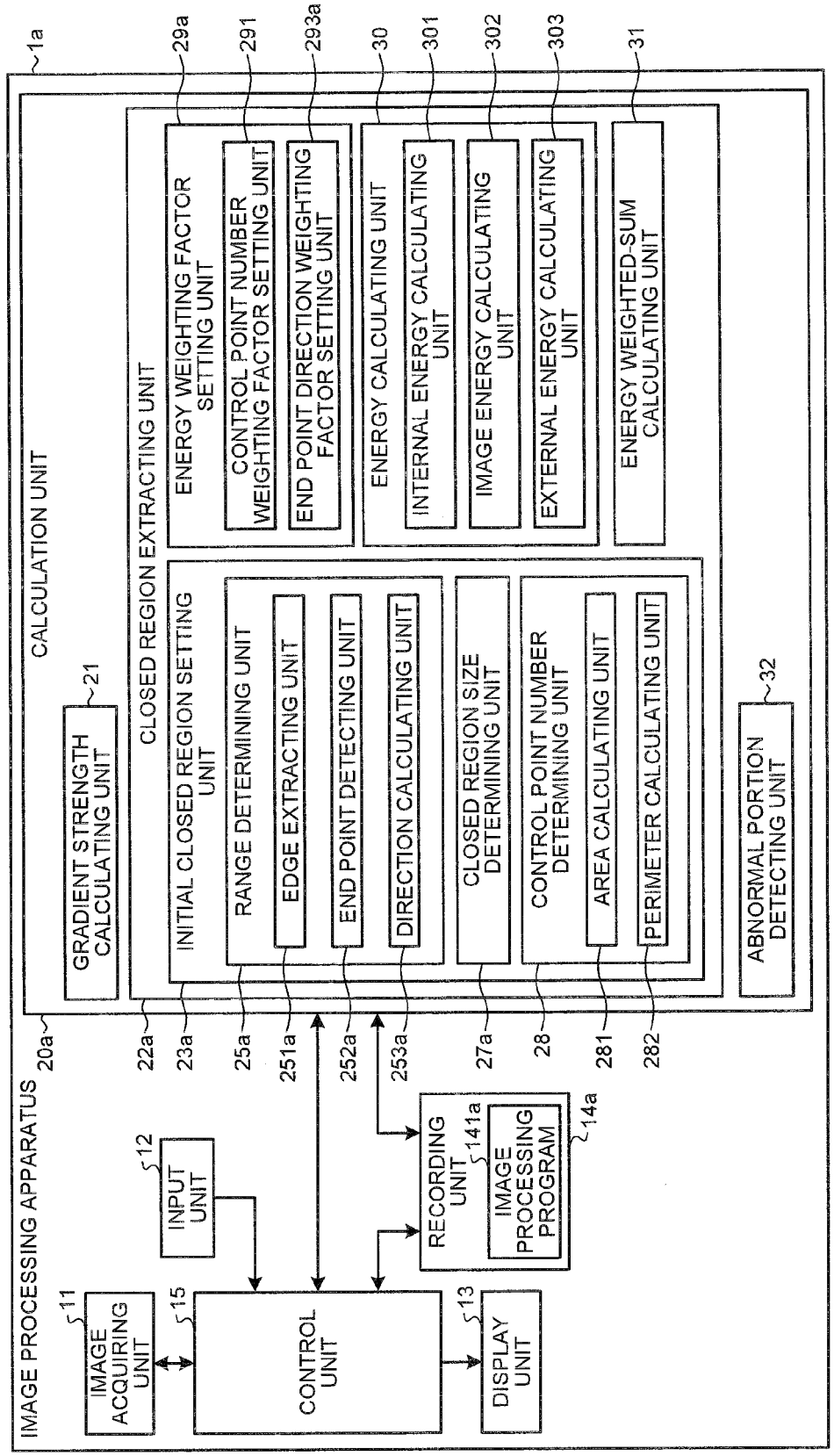
FIG. 17 is a block diagram illustrating the functional configuration of an image processing apparatus according to a second embodiment.

First, the configuration of an image processing apparatus according to a second embodiment will be described. FIG. 17 is a block diagram illustrating the functional configuration of an image processing apparatus 1a according to the second embodiment. The same reference numeral is assigned to the same configuration as that described in the first embodiment. The image processing apparatus 1a according to the second embodiment, as illustrated in FIG. 17, includes an image acquiring unit 11, an input unit 12, a display unit 13, a recording unit 14a, a calculating unit 20a, and a control unit 15 that controls the overall operation of the image processing apparatus 1a.

In the recording unit 14a, an image processing program 141a used for detecting an abnormal portion from an intraluminal image by realizing the process according to the second embodiment is recorded.

The calculation unit 20a includes a gradient strength calculating unit 21, a closed region extracting unit 22a, and an abnormal portion detecting unit 32. In addition, in the second embodiment, the closed region extracting unit 22a includes an initial closed region setting unit 23a, an energy weighting factor setting unit 29a, an energy calculating unit 30, and an energy weighted-sum calculating unit 31.

The initial closed region setting unit 23a sets an initial closed region. This initial closed region setting unit 23a includes a range determining unit 25a, a closed region size determining unit 27a, and a control point number determining unit 28. The configurations of the range determining unit 25a and the closed region size determining unit 27a are different from those of the first embodiment. In the second embodiment, the range determining unit 25a includes an edge extracting unit 251a, an end point detecting unit 252a, and a direction calculating unit 253a. The edge extracting unit 251a extracts pixels of which the gradient strength is a predetermined value or more as an edge based on the gradient strength of each pixel of the intraluminal image. The end point detecting unit 252a detects end points of an edge. The direction calculating unit 253a calculates the direction of an edge that is continuous to the end point (an edge extending from the end point) as an end point direction.

The closed region size determining unit 27a, similarly to that of the first embodiment, determines the size of the initial closed region based on the set range of the initial closed region that is determined by a range determining unit 26a. However, in the second embodiment, the size of the initial closed region to be set within the set range is determined based on a distance from an edge. In addition, also in the second embodiment, although the shape of the initial closed region is a circular shape, the shape is not limited thereto and may be an appropriate shape.

The energy weighting factor setting unit 29a sets a weighing factor for at least one energy among a plurality of energies calculated by the energy calculating unit 30 based on the position of the initial closed region. This energy weighting factor setting unit 29a includes a control point number weighting factor setting unit 291 and an end point direction weighting factor setting unit 293a and sets two types of weighting factor (a control point number weighting factor and an end point direction weighting factor) as weighting factors for the internal energy. The end point direction weighting factor setting unit 293a sets the end point direction weighting factor based on the set position of the initial closed region and the end point direction.

Figure 18:
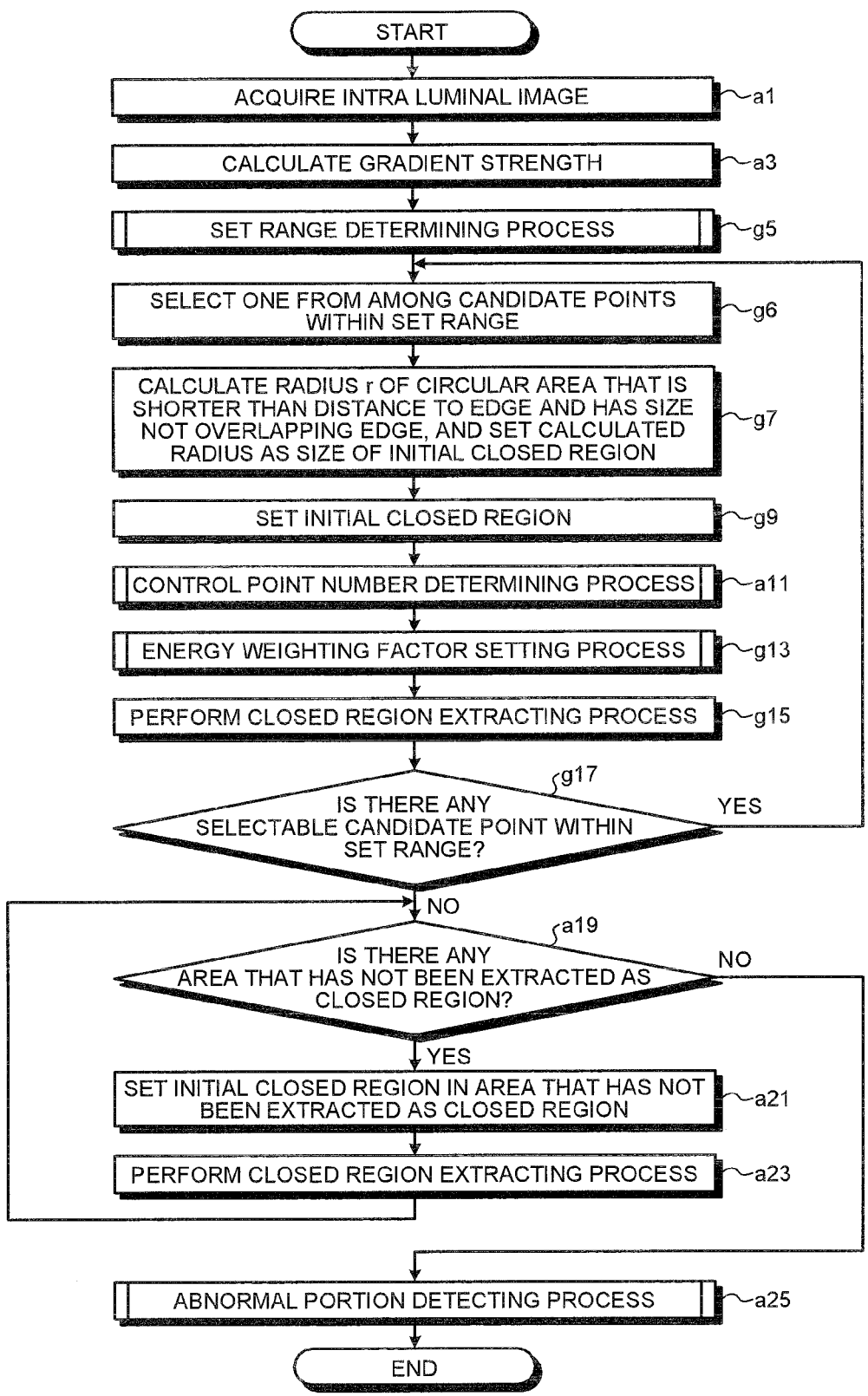
FIG. 18 is the entire flowchart illustrating the processing sequence performed by the image processing apparatus according to the second embodiment.

Next, the detailed processing sequence performed by the image processing apparatus 1a according to the second embodiment will be described. FIG. 18 is the entire flowchart illustrating the processing sequence performed by the image processing apparatus 1a according to the second embodiment. The process described here is realized by executing the image processing program 141a recorded in the recording unit 14a by using the calculating unit 20a. The same reference numeral is assigned to the same process as that of the first embodiment in FIG. 18.

As illustrated in FIG. 18, in the second embodiment, after the gradient strength calculating unit 21 calculates the gradient strength of each pixel of an intraluminal image as a processing target in Step a3, the range determining unit 26a performs a set range determining process (Step g5). FIG. 19 is a flowchart illustrating the detailed processing sequence of the set range determining process according to the second embodiment.

As illustrated in FIG. 19, in the set range determining process, first, the edge extracting unit 251a extracts a pixel of which the value of the gradient strength is, for example, a threshold value set in advance or more from the intraluminal image as the processing target as an edge based on the gradient strength calculated for each pixel in Step a3 illustrated in FIG. 18 (Step h1). This can be realized by using a known edge extracting technique such as Canny or Harris.

Subsequently, the end point detecting unit 252a detects an end point of the edge, which is extracted in Step h1 (Step h3). The detection of the end point of the edge can be realized, for example, by applying a known feature point extracting technology (reference: "Digital Image Processing", CG-ARTS Society, P 188, *Extraction of Feature Point of Fine Line*).

Subsequently, the direction calculating unit 253a calculates the direction of an edge that is continuous to the end point as the end point direction based on the detected end point (Step h5). Described in more detail, a direction in which pixels on the edge that is continuous to an end point and are located at positions apart from the pixel as the end point by a predetermined distance are joined is calculated as the end point direction. In a case where a plurality of end points is detected, the end point direction is calculated for each end point.

Subsequently, the range determining unit 25a determines an area of pixels at which an angle (hereinafter, also referred to as an "end point direction angle") formed by a straight line joining the end points and the end point direction calculated in Step h5 is a predetermined threshold value or less as the set range of the initial closed region (Step h7). For example, the calculation of the end point direction angle is performed as follows. First, the pixels of the intraluminal image are sequentially set as a processing target, and an angle formed by a straight line joining the pixel as a processing target and the end point and the end point direction calculated in Step h5 is calculated as the end point direction angle. Here, in a case where there is a plurality of end points, an end point located closest to the pixel as the processing target is selected, and an angle formed by a straight line joining the pixel as the processing target and the selected end point and the end point direction calculated for the end point in Step h5 is calculated as the end point direction angle. Alternatively, an end point direction angle with respect to an end point from which the distance to the pixel as the processing target is within a predetermined distance set in advance may be calculated. At this time, in a case where there is a plurality of end points from which the distance to the pixel as the processing target is within the predetermined distance, the end point direction angle with respect to each end point is calculated, and a smallest end point direction angle is set as the end point direction angle for the pixel as the processing target. FIG. 20 is a schematic diagram illustrating an example of an intraluminal image. FIG. 20 illustrates edges 71 and 72 that are a groove position of a mucous membrane 7 and a contour portion. In the example illustrated in FIG. 20, an end point P61 of the edge 72 is detected through the process of Step h3 illustrated in FIG. 19, and a direction joining the end point P61 and a pixel P62 located apart from the end point P61 on the edge 72 by a predetermined distance is calculated as the end point direction by the process of Step h5. Then, in Step h7, for example, inside the area surrounded by the edge 71, an area of pixels at which the end point direction angle formed by a straight line joining the end point P61 and the end point direction is a predetermined threshold value or less is set as the set range of the initial closed region.

At a pixel position at which the end point direction angle formed by a straight line joining the end point and the end point direction is large, there is a high possibility that there is an end point of an edge or an edge that largely bends near the pixel position. For example, near a pixel P65 where an angle θ3 formed by a straight line joining the end point P61 and the end point direction is large, an end point P61 of the edge 72 is present. Thus, in Step h5 illustrated in FIG. 19, an area acquired by excluding a pixel such as the pixel P65 at which the end point direction angle is large is set as the set range of the initial closed region. In other words, for example, an angle θ1 that is formed by a straight line joining a pixel P63 and the end point P61 and the end point direction or an angle θ2 that is formed by a straight line joining a pixel P64 and the end point P61 and the end point direction is small to some degree, and accordingly, such pixels P63 and P64 are set within the set range of the initial closed region.

Thereafter, the range determining unit 25a arranges candidate points within the set range, which is determined in Step h7 (Step h9). For example, the range determining unit 25a delimits the pixels determined as the set range for each connected component and calculates the center of each delimited area. Then, the range determining unit 25a arranges candidate points at the calculated center positions.

In addition, in a case where the intraluminal image is delimited into a plurality of areas by the edge detected in Step h1, the process of Steps h3 to h9 is performed for each area so as to determine the set range of each initial closed region. When the set range of the initial closed region is determined, the process is returned to Step g5 illustrated in FIG. 18 and thereafter proceeds to Step g6.

In Step g6, the closed region size determining unit 27a selects one from among the candidate points arranged within the set range in Step h9 illustrated in FIG. 19. For example, a candidate point at which the end point direction angle calculated in Step h7 illustrated in FIG. 19 is the smallest is selected from among the candidate points arranged within the set range. The method of selecting a candidate point is not particularly limited, and a method may be used in which a candidate point is randomly selected from among candidate points arranged within the set range.

Subsequently, the closed region size determining unit 27a calculates a radius r of a circular area that is a circular area having the position of the candidate point selected in Step a6 as its center position, has a size shorter than a distance to the edge, and does not overlap the edge so as to be set as the size of the initial closed region (Step g7). Then, the initial closed region setting unit 23a sets the position of the candidate point selected in Step g6 as the center position and sets a circular area of a radius r that is shorter than the distance to the edge that is calculated for the corresponding center position in Step g7 as the initial closed region (Step g9).

Figure 21:
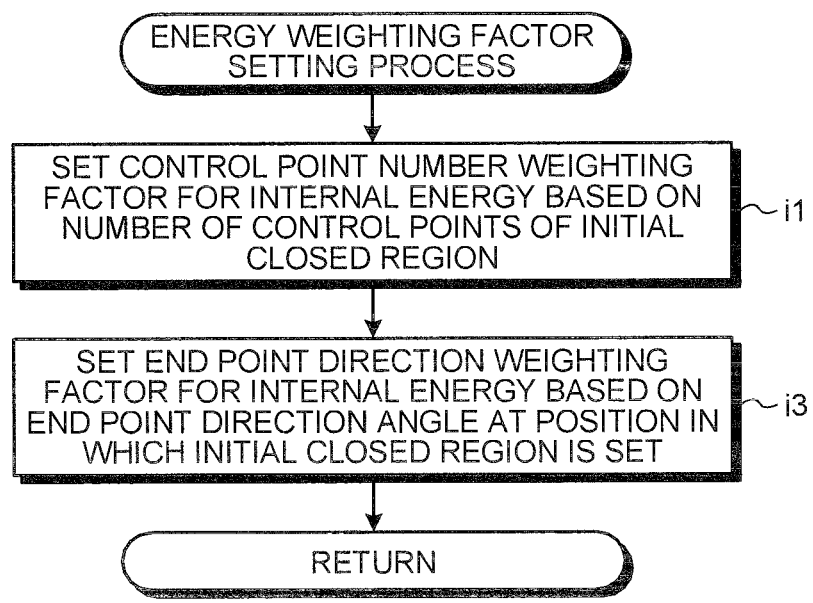
FIG. 21 is a flowchart illustrating the detailed processing sequence of an energy weighing factor setting process according to the second embodiment.

When the initial close region (the initial shape of the closed region) is set within the set range as described above, subsequently, the control point number determining unit 28 determines the number of control points of the initial closed region by performing a control point number determining process (see FIG. 13) (Step a11). Then, in the following Step g13, the energy weighting factor setting unit 29a sets a control point number weighing factor and an end point direction weighting factor for the initial closed region by performing an energy weighting factor setting process. FIG. 21 is a flowchart illustrating the detailed processing sequence of the energy weighing factor setting process according to the second embodiment.

As illustrated in FIG. 21, in the energy weighting factor setting process, first, the control point number weighting factor setting unit 291 sets the control point number weighting factor for the internal energy based on the number of control points of the initial closed region (Step i1). This can be realized by a process similar to that of Step d1 illustrated in FIG. 14.

Subsequently, the end point direction weighting factor setting unit 293a sets an end point direction weighting factor for the internal energy based on the end point direction angle calculated for the center as the center position of the initial closed region (Step i3). As described above, in a case where the end point direction angle at the center position of the initial closed region is large, there is a high possibility that an end point of an edge or an edge that largely bends is present on the periphery thereof. In Step i3, in order not to extract a closed region into which such an end point of an edge gets or a closed region having a boundary including an edge that largely bends, the end point direction weighting factor for the internal energy is set so as to have a larger value as the end point direction angle becomes larger in accordance with the following Equation (10).

$$\text{End Point Weighting Factor} = \text{End Point Direction Angle at Center as Center Position} \times \text{Predetermined Coefficient} \quad (10)$$

When the control point number weighing factor and the end point direction weighting factor are set, the process is returned to Step g13 illustrated in FIG. 18 and thereafter proceeds to Step g15. Then, in Step g15, the closed region extracting unit 22a performs a closed region extracting process. This can be realized by a processing sequence similar to that of the closed region extracting process, which has been described in the first embodiment, illustrated in FIG. 15. However, in the second embodiment, as the process of Step e7, the energy weighted-sum calculating unit 31 extracts a closed region by acquiring a minimum value of the weighted sum of the internal energy weighted by the control point number weighting factor and the end point direction weighting factor set in the energy weighting factor setting process illustrated in FIG. 21, the image energy, and the external energy.

Subsequently, the initial closed region setting unit 23a determines whether or not there is a selectable candidate point within the set range. The determination here is performed similarly to Step a17 illustrated in FIG. 7 described in the first embodiment. In a case where there is a selectable candidate point (Yes in Step g17), the process is returned to Step g6, and the closed region size determining unit 27a selects a candidate point, for example, that has a largest pixel value in the distance image from among selectable candidate points. Thereafter, the process of Step g7 and the subsequent processes are performed for the selected candidate point. On the other hand, in a case where there is no selectable candidate point within the set range (No in Step g17), the process proceeds to Step a19.

As described above, according to the second embodiment, an edge is extracted from an intraluminal image and detects the end points thereof. Then, an area acquired by excluding a pixel, at which the end point direction angle formed by the straight line joining the end point and the end point direction is small, having a high possibility that an end point of an edge or an edge that largely bends is present on the outside thereof is determined as the set range of the initial closed region. Then, a closed region is extracted by using an active contour extraction method while weighting the internal energy representing the degree of smoothness of the boundary of the closed region by the end point direction weighting factor, which is set to have a larger value as the end point direction angle at the center position of the initial closed region is larger. According to the second embodiment, advantages similar to those of the first embodiment can be acquired.

In addition, according to the second embodiment, a candidate point at which the end point direction angle calculated in Step h7 illustrated in FIG. 19 is the smallest is selected from among the candidate points arranged within the set range. Meanwhile, in Step a21 illustrated in FIG. 18, as described in the first embodiment, an initial closed region, for example, having a circular shape is set so as to include an area that is not extracted as the closed region. On the other hand, an evaluation value of each candidate point may be calculated in accordance with the following Equation (11), and the candidate points are sequentially selected from a candidate point having a highest evaluation value. Furthermore, in Step a21 illustrated in FIG. 18, the evaluation value of each pixel located in an area that is not extracted as the closed region may be calculated in accordance with the following Equation (11), and an initial closed region is set so as to have a pixel having a highest evaluation value as its center position. In the following Equation (11), a distance image value is a pixel value of a pixel as an evaluation target in the distance image.

$$\text{Evaluation Value} = \text{End Point Direction Angle} \times \text{Predetermined Coefficient} + \text{Distance Image Value} \quad (11)$$

The functional configuration illustrated in FIG. 17 is merely an example, and the functional configuration is not limited thereto. The range determining unit 25a is configured so as to include the edge extracting unit 251a, the end point detecting unit 252a, and the direction calculating unit 253a as illustrated in FIG. 17. However, for example, in a case where the calculation unit 20a can calculate the end point direction, the range determining unit 25a can determine the set range based on the end point direction, and the end point direction weighting factor setting unit 293a of the energy weighting factor setting unit 29a can set the end point direction weighting factor based on the end point direction, the configuration is not limited to a configuration including the range determining unit 25a.

Third Embodiment

Figure 22:
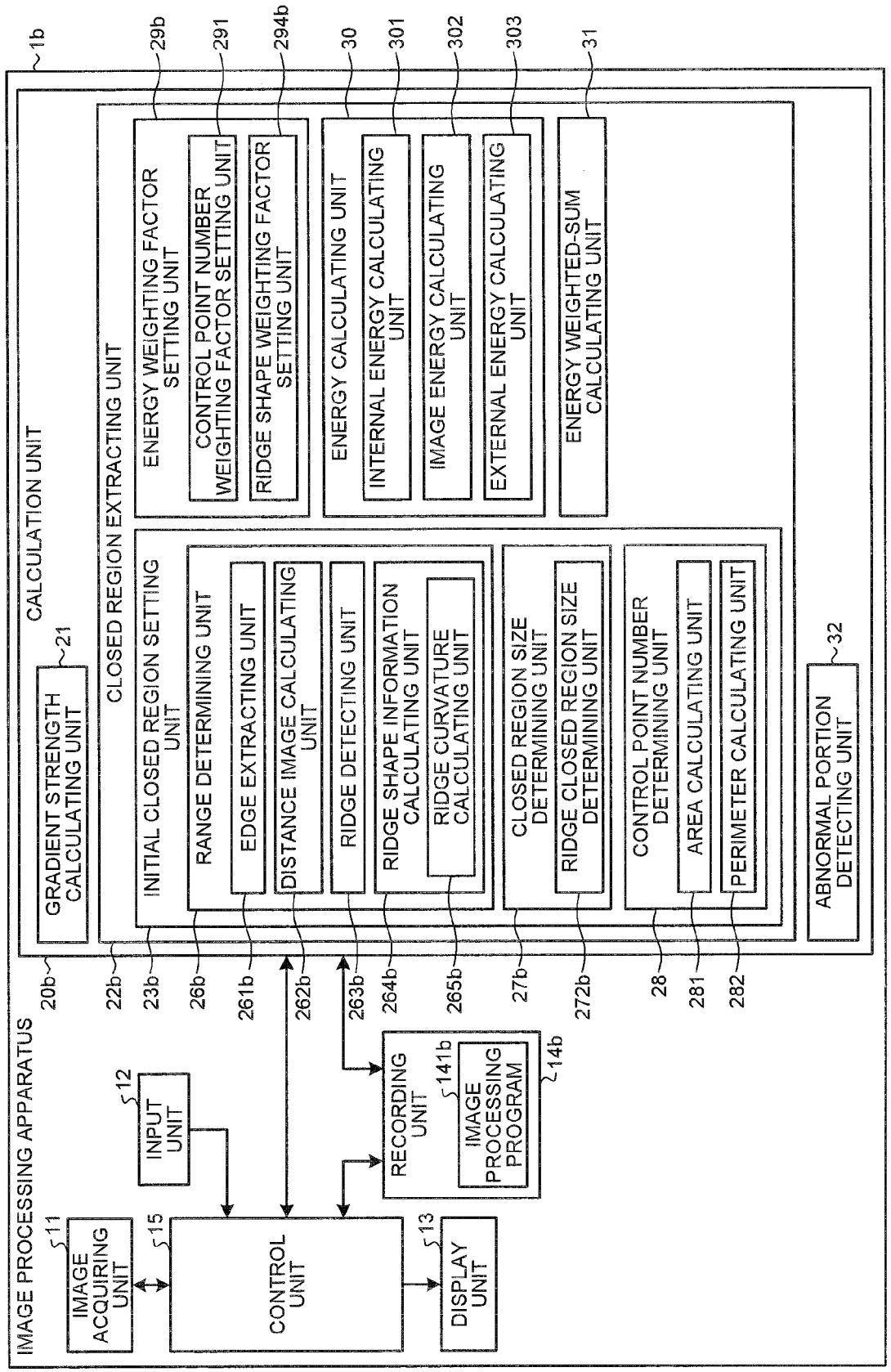
FIG. 22 is a block diagram illustrating the functional configuration of an image processing apparatus according to a third embodiment.

First, the configuration of an image processing apparatus according to a third embodiment will be described. FIG. 22 is a block diagram illustrating the functional configuration of an image processing apparatus 1b according to the third embodiment. The same reference numeral is assigned to the same configuration as that described in the first embodiment. The image processing apparatus 1b according to the third embodiment, as illustrated in FIG. 22, includes an image acquiring unit 11, an input unit 12, a display unit 13, a recording unit 14b, a calculating unit 20b, and a control unit 15 that controls the overall operation of the image processing apparatus 1b.

In the recording unit 14b, an image processing program 141b used for detecting an abnormal portion from an intraluminal image by realizing the process according to the third embodiment is recorded.

The calculation unit 20b includes a gradient strength calculating unit 21, a closed region extracting unit 22b, and an abnormal portion detecting unit 32. In addition, in the third embodiment, the closed region extracting unit 22b includes an initial closed region setting unit 23b, an energy weighting factor setting unit 29b, an energy calculating unit 30, and an energy weighted-sum calculating unit 31.

The initial closed region setting unit 23b sets an initial closed region. This initial closed region setting unit 23b includes a range determining unit 26b, a closed region size determining unit 27b, and a control point number determining unit 28. The configurations of the range determining unit 26b and the closed region size determining unit 27b are different from those of the first embodiment. In the third embodiment, the range determining unit 26b includes an edge extracting unit 261b, a distance image calculating unit 262b, a ridge detecting unit 263b, and a ridge shape information calculating unit 264b. The edge extracting unit 261b extracts pixels of which the gradient strength is a predetermined value or more as an edge based on the gradient strength of each pixel of the intraluminal image. The distance image calculating unit 262b calculates a distance image that represents a distance from the edge. The ridge detecting unit 263b detects the ridge of a distance image. The ridge shape information calculating unit 264b calculates the shape information of a ridge. This ridge shape information calculating unit 264b includes a ridge curvature calculating unit 265b that calculates the curvature of a ridge.

The closed region size determining unit 27b, similarly to that of the first embodiment, determines the size of the initial closed region based on the set range of the initial closed region that is determined by the range determining unit 26b. However, in the third embodiment, a ridge closed region size determining unit 272b of the closed region size determining unit 27b determines the size of an initial closed region to be set within the set range based on a distance from the edge to the ridge within the set range. In addition, also in the third embodiment, although the shape of the initial closed region is a circular shape, the shape is not limited thereto and may be an appropriate shape.

The energy weighting factor setting unit 29b sets a weighting factor for at least one energy among a plurality of energies calculated by the energy calculating unit 30 based on the position of the initial closed region. This energy weighting factor setting unit 29b includes a control point number weighting factor setting unit 291 and a ridge shape weighting factor setting unit 294b, and sets two types of weighting factor (a control point number weighting factor and a ridge shape weighting factor) as weighting factors for the internal energy. The ridge shape weighting factor setting unit 294b sets a ridge shape weighting factor based on the shape information of a ridge at the position at which the initial closed region is set.

Figure 23:
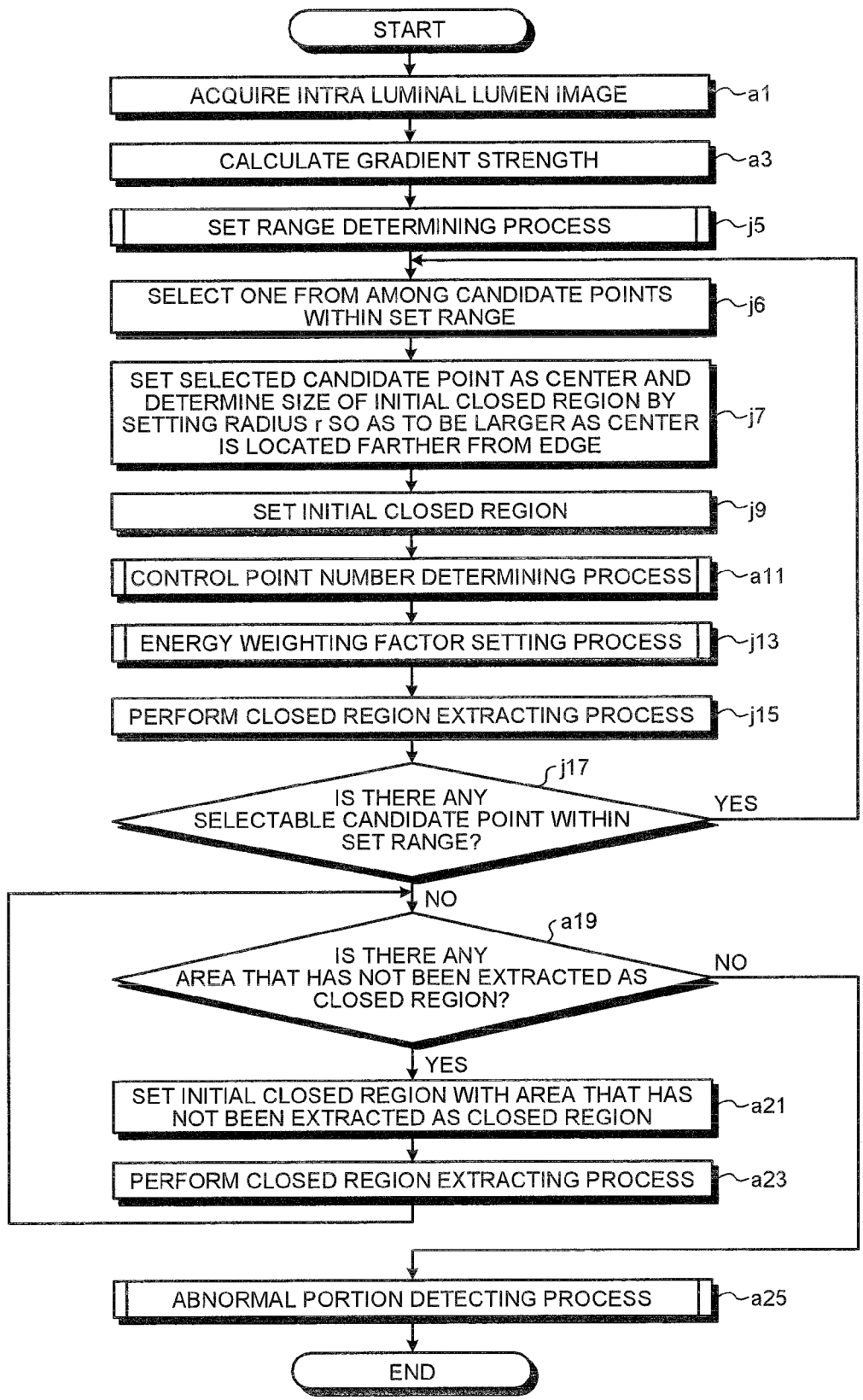
FIG. 23 is the entire flowchart illustrating the processing sequence performed by the image processing apparatus according to the third embodiment.

Next, the detailed processing sequence performed by the image processing apparatus 1b according to the third embodiment will be described. FIG. 23 is the entire flowchart illustrating the processing sequence performed by the image processing apparatus 1b according to the third embodiment. The process described here is realized by executing the image processing program 141b recorded in the recording unit 14b by using the calculating unit 20b. The same reference numeral is assigned to the same process as that of the first embodiment in FIG. 23.

Figure 24:
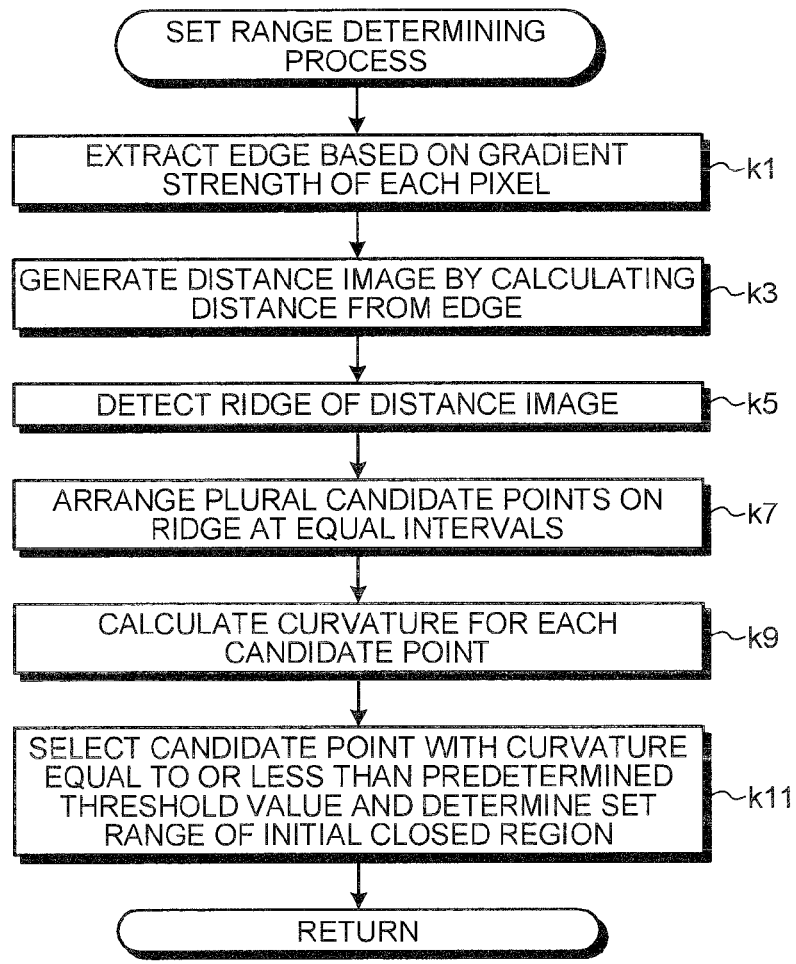
FIG. 24 is a flowchart illustrating the detailed processing sequence of a set range determining process according to the third embodiment.

As illustrated in FIG. 23, in the third embodiment, after the gradient strength calculating unit 21 calculates the gradient strength of each pixel of an intraluminal image as a processing target in Step a3, the range determining unit 26b performs a set range determining process (Step j5). FIG. 24 is a flowchart illustrating the detailed processing sequence of the set range determining process according to the third embodiment.

As illustrated in FIG. 24, in the set range determining process, first, the edge extracting unit 261b extracts a pixel of which the value of the gradient strength is, for example, a threshold value set in advance or more from the intraluminal image as the processing target as an edge based on the gradient strength calculated for each pixel in Step a3 illustrated in FIG. 23 (Step k1). This can be realized by using a known edge extracting technique such as Canny or Harris.

Subsequently, the distance image calculating unit 262b calculates a distance to the edge extracted in Step k1 for each pixel and generates a distance image in which the pixel value of each pixel is set to the value of the distance calculated for the corresponding pixel (Step k3). Then, the ridge detecting unit 263b detects a ridge of the distance image (Step k5). For example, this can be realized by applying a skeleton extracting process or the like.

Subsequently, the ridge curvature calculating unit 265b calculates the curvature of the ridge, which is calculated in Step k5, as the shape information of the ridge. In other words, first, the ridge curvature calculating unit 265b arranges a plurality of candidate points on the ridge so as to be equally spaced (Step k7). Subsequently, the ridge curvature calculating unit 265b calculates an inner product of two adjacent candidate points of each candidate point arranged in Step k7 and sets the inner product as the curvature of the ridge (Step k9).

Subsequently, the range determining unit 26b performs threshold value processing for the curvature calculated for each candidate point in Step k9. Then, the range determining unit 26b selects candidate points at which the curvature is a threshold value set in advance or less and determines the range of the selected candidate points as a set range of the initial closed region (Step k11).

In addition, in a case where the intraluminal image is delimited into a plurality of areas by the edge detected in Step k1, the process of Steps k3 to k11 is performed for each area so as to determine the set range of each initial closed region. When the set range of the initial closed region is determined, the process is returned to Step j5 illustrated in FIG. 23 and thereafter proceeds to Step j6.

In Step j6, the ridge closed region size determining unit 272b selects one candidate point from among the candidate points arranged within the set range determined in Step k7 illustrated in FIG. 24. For example, a candidate point of which the pixel value in the distance image is the largest is selected based on the pixel value of each candidate point (pixel) within the set range in the distance image generated in Step k3 illustrated in FIG. 24. The method of selecting a candidate point is not particularly limited, and a method may be used in which a candidate point is randomly selected from among candidate points arranged within the set range.

Subsequently, the ridge closed region size determining unit 272b calculates a radius r of a circular area having the position of the candidate point selected in Step j6 as its center position so as to be set as the size of the initial closed region (Step j7). At this time, the radius r is set based on a distance from the center position of the initial closed region to the edge such that the value of the radius r is larger as the distance becomes longer. Then, the initial closed region setting unit 23b sets the position of the candidate point selected in Step j6 as the center position and sets a circular area of a radius r that is calculated for the corresponding center position in Step j7 as the initial closed region (Step j9).

Figure 25:
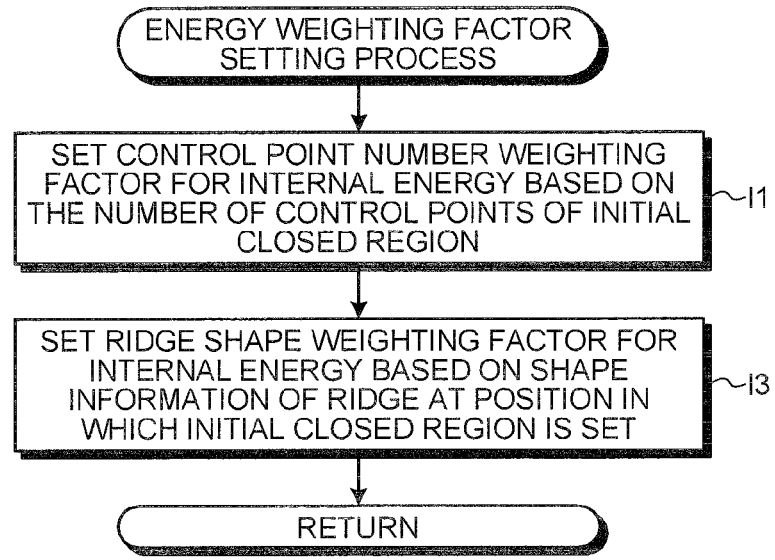
FIG. 25 is a flowchart illustrating the detailed processing sequence of an energy weighing factor setting process according to the third embodiment.

When the initial close region (the initial shape of the closed region) is set within the set range as described above, subsequently, the control point number determining unit 28 determines the number of control points of the initial closed region by performing a control point number determining process (see FIG. 13) (Step a11). Then, in the following Step j13, the energy weighting factor setting unit 29b sets a control point number weighing factor and a ridge shape weighting factor for the initial closed region by performing an energy weighting factor setting process. FIG. 25 is a flowchart illustrating the detailed processing sequence of the energy weighing factor setting process according to the third embodiment.

As illustrated in FIG. 25, in the energy weighting factor setting process, first, the control point number weighting factor setting unit 291 sets the control point number weighting factor for the internal energy based on the number of control points of the initial closed region (Step 11). This can be realized by a process similar to that of Step d1 illustrated in FIG. 14.

Subsequently, the ridge shape weighting factor setting unit 294b sets a ridge shape weighting factor for the internal energy based on the shape information (the curvature of a ridge that is calculated in Step k9 illustrated in FIG. 24 for the candidate point as the center position) of a ridge at the center position of the initial closed region (Step 13). Here, the ridge is detected as a pixel position that is located far from the edge position located inside the intraluminal image. Similarly to the first embodiment, at a position of the candidate point in the ridge at which the value of the curvature acquired in Step k9 illustrated in FIG. 24 is large, that is, a position at which the ridge largely bends, there is a high possibility that an end point of an edge or an edge that largely bends is present near the position of the candidate point. In Step 13, in order not to extract a closed region into which an end point of an edge gets or a closed region having a boundary including an edge that largely bends, the ridge shape weighting factor for the internal energy is set so as to have a larger value as the ridge shape information (the curvature of the ridge at the position of the candidate point as the center position) becomes larger in accordance with the following Equation (12).

Ridge Shape Weighting Factor=Curvature of Ridge at Candidate Point as Center Position×Predetermined Coefficient (12)

When the control point number weighing factor and the ridge shape weighting factor are set, the process is returned to Step j13 illustrated in FIG. 23 and thereafter proceeds to Step j15. Then, in Step j15, the closed region extracting unit 22b performs a closed region extracting process. This can be realized by a processing sequence similar to that of the closed region extracting process, which has been described in the first embodiment, illustrated in FIG. 15. However, in the third embodiment, as the process of Step e7, the energy weighted-sum calculating unit 31 extracts a closed region by acquiring a minimum value of the weighted sum of the internal energy weighted by the control point number weighting factor and the ridge shape weighting factor set in the energy weighting factor setting process illustrated in FIG. 25, the image energy, and the external energy.

Subsequently, the initial closed region setting unit 23b determines whether or not there is a selectable candidate point within the set range. The determination here is performed similarly to Step a17 illustrated in FIG. 7 described in the first embodiment. In a case where there is a selectable candidate point (Yes in Step j17), the process is returned to Step j6, and the ridge closed region size determining unit 272b selects a candidate point, for example, that has a largest pixel value in the distance image from among selectable candidate points. Thereafter, the process of Step j7 and after that is performed for the selected candidate point. On the other hand, in a case where there is no selectable candidate point within the set range (No in Step j17), the process proceeds to Step a19.

As described above, according to the third embodiment, instead of the central line of the flat area acquired in the first embodiment, a ridge located far from the edge is detected, a set range of the initial closed region is determined based on the curvature thereof, and the ridge shape weighting factor for the internal energy is set. According to this third embodiment, the advantages similar to those of the first embodiment can be acquired.

In addition, according to the third embodiment, candidate points are selected based on the pixel value of each candidate point within the set range in the distance image sequentially starting from a candidate point having a largest pixel value in the distance image. Meanwhile, in Step a21 illustrated in FIG. 23, as described in the first embodiment, an initial closed region, for example, having a circular shape is set so as to include an area that is not extracted as the closed region. On the other hand, an evaluation value of each candidate point may be calculated in accordance with the following Equation (13), and the candidate points are sequentially selected starting from a candidate point having a highest evaluation value, described in more detail, sequentially selected from a candidate point having a largest pixel value in the distance image on the ridge. Furthermore, in Step a21 illustrated in FIG. 23, the evaluation value of each pixel located in an area that is not extracted as the closed region may be calculated in accordance with the following Equation (13), and an initial closed region is set so as to have a pixel having a highest evaluation value as its center position. In the following Equation (13), a ridge position flag represents flag information indicating whether or not a pixel (a pixel located at a candidate point or in an area that is not extracted as a closed region) as an evaluation target is positioned on a ridge. In the case of a candidate point, the ridge position flag=1, and, in the case of a pixel located in an area that is not extracted as a closed region, the ridge position flag=0. In addition, the value of the distance image is a pixel value of the pixel as an evaluation target in the distance image.

Evaluation Value=Ridge Position Flag×Predetermined
Coefficient+Distance Image Value    (13)

The functional configuration illustrated in FIG. 22 is merely an example, and the functional configuration is not limited thereto. The range determining unit 26b is configured so as to include the edge extracting unit 261b, the distance image calculating unit 262b, the ridge detecting unit 263b, and the ridge shape information calculating unit 264b as illustrated in FIG. 22. However, for example, in a case where the calculation unit 20b can calculate the shape information of a ridge, the range determining unit 26b can determine a set range based on the shape information of the ridge, and the ridge shape weighting factor setting unit 294b of the energy weighting factor setting unit 29b can set the ridge shape weighting factor based on the shape information of the ridge, the configuration is not limited to a configuration including the range determining unit 26b.

Furthermore, the image processing apparatus 1 according to the first embodiment, the image processing apparatus 1a according to the second embodiment, and the image processing apparatus 1b according to the third embodiment described above can be realized by executing a program prepared in advance by using a computer system such as a personal computer or a workstation. Hereinafter, a computer system that has the same functions as those of the image processing apparatuses 1, 1a, and 1b described in the first to third embodiments and executes the image processing program 141, 141a, or 141b will be described.

Figure 26:
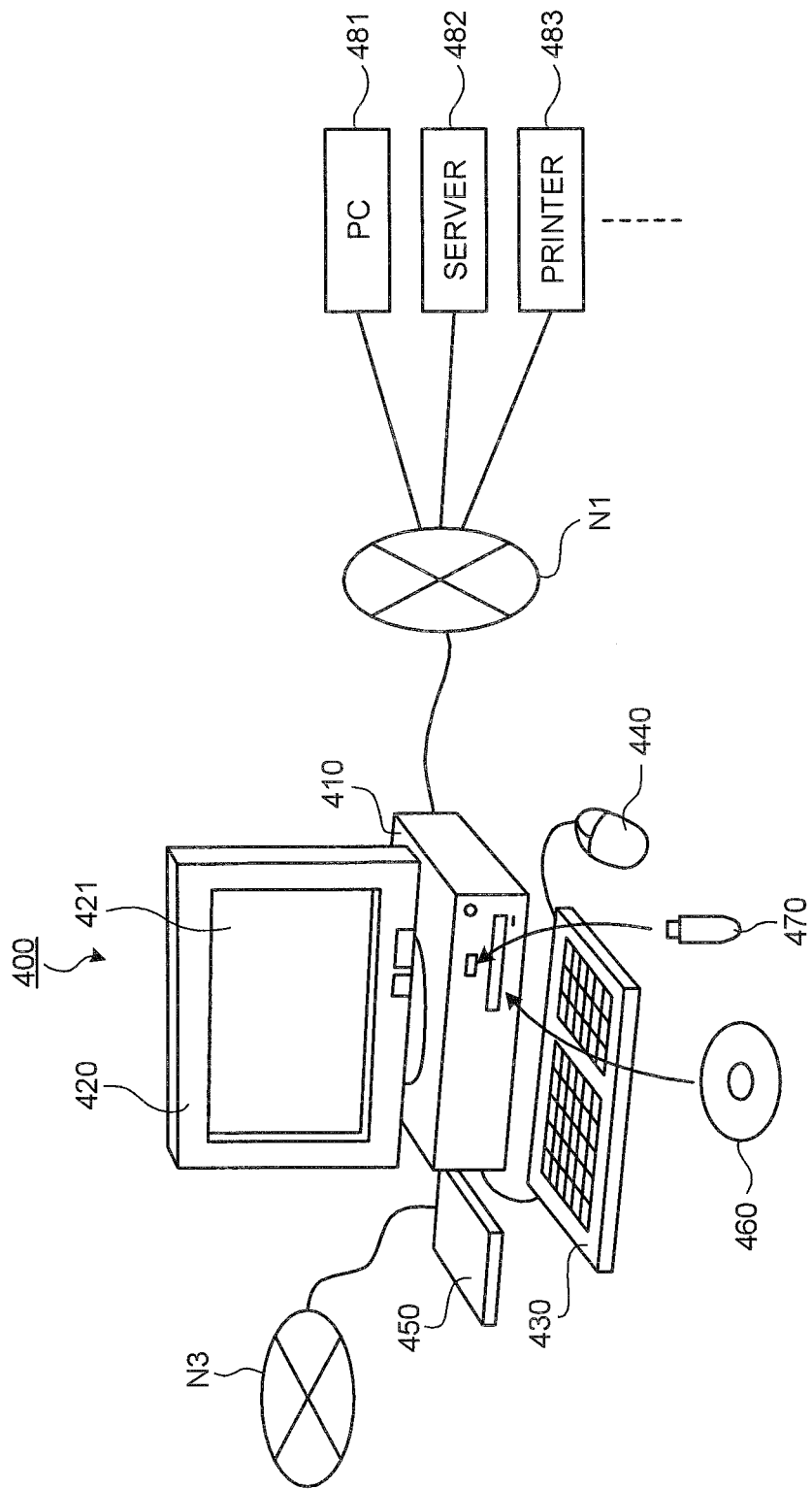
FIG. 26 is a system configuration diagram illustrating the configuration of a computer system to which the present invention is applied.
Figure 27:
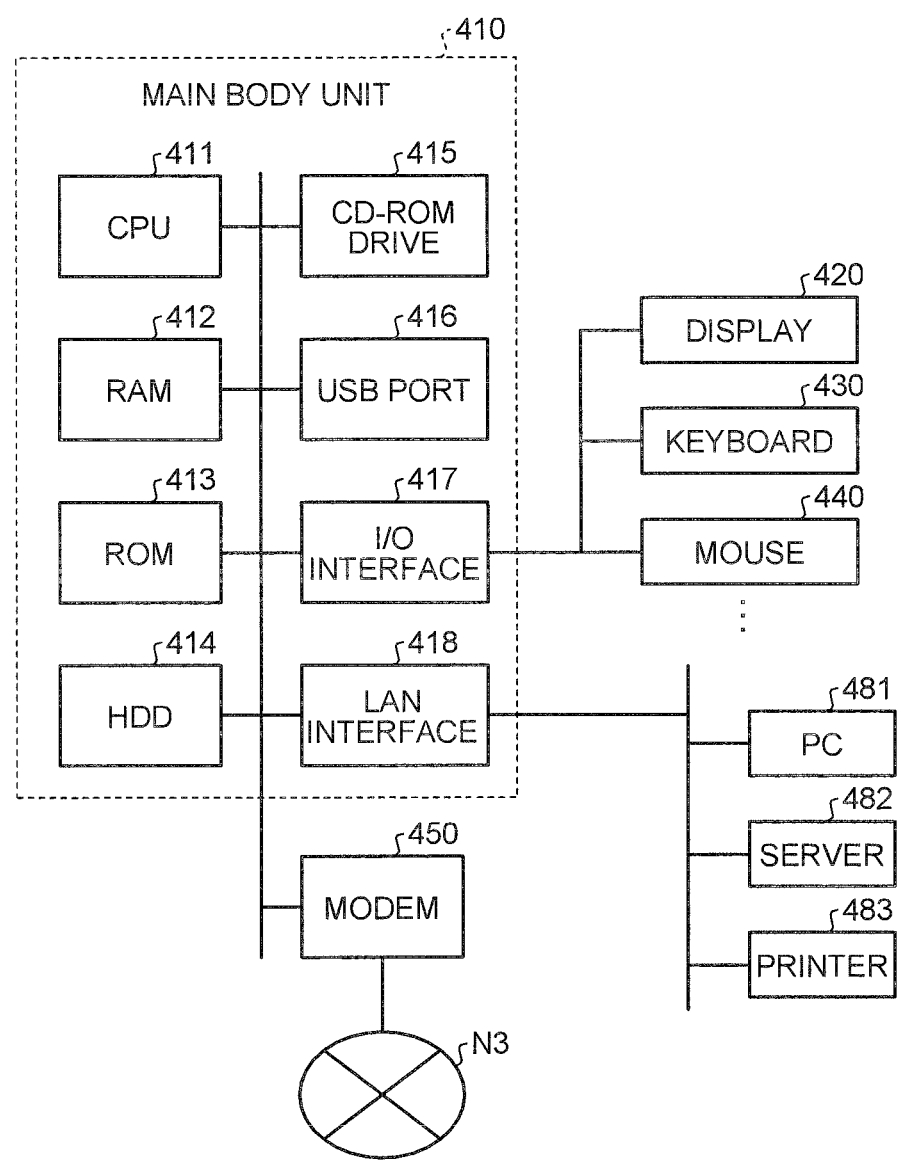
FIG. 27 is a block diagram illustrating the configuration of a main body unit of the computer system illustrated in FIG. 26.

FIG. 26 is a system configuration diagram illustrating the configuration of a computer system 400 according to this modified example, and FIG. 27 is a block diagram illustrating the configuration of a main body unit 410 of the computer system 400. As illustrated in FIG. 26, the computer system 400 includes a main body unit 410, a display 420 that is used for displaying information such as an image on a display screen 421 in accordance with an instruction transmitted from the main body unit 410, a keyboard 430 that is used for inputting various types of information to the computer system 400, and a mouse 440 that is used for designating an arbitrary position on the display screen 421 of the display 420.

In addition, the main body unit 410 of this computer system 400, as illustrated in FIGS. 26 and 27, includes a CPU 411, a RAM 412, a ROM 413, a hard disk drive (HDD) 414, a CD-ROM drive 415 that accepts a CD-ROM 460, a USB port 416 to which a USB memory 470 can be detachably connected, an I/O interface 417 that connects the display 420, the keyboard 430, and the mouse 440 together, and a LAN interface 418 that is used for being connected to a local area network or a wide area network (LAN/WAN) N1.

Furthermore, to this computer system 400, a modem 450 that is used for being connected to a public circuit N3 such as the Internet is connected, and a personal computer (PC) 481 as another computer system, a server 482, a printer 483, and the like are connected through the LAN interface 418 and the local area network or the wide area network N1.

This computer system 400 realizes the image processing apparatus (for example, the image processing apparatus 1 according to the first embodiment, the image processing apparatus 1a according to the second embodiment, or the image processing apparatus 1b according to the third embodiment) by reading out and executing an image processing program (for example, the image processing program 141 according to the first embodiment, the image processing program 141a according to the second embodiment, or the image processing program 141b according to the third embodiment) stored on a recording medium. Here, the recording media includes all types of recording media on which an image processing program is recorded so as to be readable by using the computer system 400 such as "portable-type physical media" including an MO disc, a DVD disc, a flexible disc, (FD), an IC card, and the like in addition to a CD-ROM 460 and a USB memory 470, "fixed-type physical media" including an HDD 414, a RAM 412, a ROM 413, and the like that can be internally or externally included in the computer system 400, and "communication media" such as a public circuit N3 that is connected through the modem 450, a local area network or a wide area network N1 to which the PC 481 as another computer system or the server 482 is connected, and the like that store a program for a short time when the program is transmitted.

In other words, the image processing program is recorded on a recording medium such as a "portable-type physical medium", a "fixed-type physical medium", or a "communication medium" in a computer-readable form, and the image processing apparatus is realized by reading out the image processing program from such a recording medium and executing the image processing program by using the computer system 400. In addition, the image processing program is not limited as being executed by the computer system 400, and the present invention can be similarly applied to a case where the PC 481 as another computer system or the server 482 executes the image processing program or a case where the PC 481 and the server 482 cooperatively execute the image processing program.

In addition, the present invention is not limited to the first to third embodiments and modified examples thereof described above, and various inventions can be configured by appropriately combining a plurality of constituent elements disclosed in the embodiments. For example, a configuration may be employed in which several constituent elements are excluded from all the constituent elements illustrated in each embodiment or a modified example. Alternatively, the constituent elements illustrated in other embodiments or other modified examples may be appropriately combined.

According to an aspect of the present invention described above, there is an advantage that an abnormal portion can be detected from an intraluminal image with high accuracy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
  a gradient strength calculating unit that calculates gradient strength of a pixel value of each pixel of an intraluminal image that is a captured image of an intralumen;
  a closed region extracting unit that extracts a closed region from the intraluminal image, the closed region satisfying conditions that the pixel of which gradient strength is a predetermined value or more is not included in the closed region and a boundary of the closed region does not bend with predetermined curvature or higher toward an inner side of the closed region; and
  an abnormal portion detecting unit that detects an abnormal portion located inside the closed region,
  wherein the closed region extracting unit includes
    an initial closed region setting unit that sets an initial closed region having an initial shape of the closed region based on the gradient strength;

an energy calculating unit that calculates values of a plurality of types of energy that at least include energy determined based on an outer shape of the closed region and energy determined based on the gradient strength on the boundary of the closed region; and an energy weighted-sum calculating unit that calculates a weighted sum of the plurality of types of energy, the closed region is extracted by transforming the initial closed region based on the weighted sum, and the initial closed region setting unit includes a range determining unit that determines a set range of the initial closed region based on the gradient strength.

2. The image processing apparatus according to claim 1, wherein the energy calculating unit includes an internal energy calculating unit that calculates internal energy representing a smaller value as the shape of the closed region is smoother;

an image energy calculating unit that calculates image energy representing a smaller value as a value of the gradient strength on the boundary of the closed region is larger; and an external energy calculating unit that calculates external energy representing a smaller value as a size of the closed region is larger, and wherein the closed region extracting unit extracts the closed region by transforming the initial closed region such that a weighted sum of at least two of the internal energy, the image energy, and the external energy is a minimum.

3. The image processing apparatus according to claim 1, wherein the range determining unit includes a flat area extracting unit that extracts a flat area made up of a plurality of pixels of which values of the gradient strength are close to one another from the intraluminal image and determines the set range within the flat area.

4. The image processing apparatus according to claim 3, wherein the range determining unit includes an area shape information calculating unit that calculates shape information of the flat area and determines the set range based on the shape information of the flat area.

5. The image processing apparatus according to claim 4, wherein the area shape information calculating unit includes a central line calculating unit that calculates a central line of the flat area; and a curvature calculating unit that calculates curvature of the central line, and sets the curvature of the central line as the shape information of the flat area.

6. The image processing apparatus according to claim 1, wherein the range determining unit includes an edge extracting unit that extracts pixels of which the gradient strength is a predetermined value or higher from the each pixel of the intraluminal image as an edge and determines the set range based on the edge.

7. The image processing apparatus according to claim 6, wherein the range determining unit includes an end point detecting unit that detects an end point of the edge; and a direction calculating unit that calculates a direction of the edge that is continuous to the end point as an end point direction, and determines the set range based on the end point direction.

8. The image processing apparatus according to claim 6, wherein the range determining unit includes a distance image calculating unit that calculates a distance image representing a distance from the edge and determines the set range based on the distance image.

9. The image processing apparatus according to claim 8, wherein the initial closed region setting unit sets the initial closed region at a position at which a pixel value is large based on pixel values of pixels, which are located in the set range, in the distance image.

10. The image processing apparatus according to claim 8, wherein the initial closed region setting unit includes a closed region size determining unit that determines a size of the initial closed region based on pixel values of the pixels, which are located in the set range, in the distance image.

11. The image processing apparatus according to claim 8, wherein the range determining unit includes a ridge detecting unit that detects a ridge of the distance image and determines the set range based on the ridge.

12. The image processing apparatus according to claim 11, wherein the initial closed region setting unit sets the initial closed region at a position at which a pixel value is large based on pixel values of the pixels located on the ridge included in the set range in the distance image.

13. The image processing apparatus according to claim 11, wherein the range determining unit includes a ridge shape information calculating unit that calculates shape information of the ridge and determines the set range based on the shape information of the ridge.

14. The image processing apparatus according to claim 13, wherein the ridge shape information calculating unit includes a ridge curvature calculating unit that calculates curvature of the ridge and sets the curvature of the ridge as the shape information of the ridge.

15. The image processing apparatus according to claim 1, wherein the initial closed region setting unit includes a closed region size determining unit that determines a size of the initial closed region based on the set range.

16. The image processing apparatus according to claim 15, wherein the closed region size determining unit includes an inscription area size determining unit that has a predetermined shape and determines a size inscribed in the set range as the size of the initial closed region.

17. The image processing apparatus according to claim 15, further comprising:

an edge extracting unit that extracts pixels of which the gradient strength is a predetermined value or higher from the each pixel of the intraluminal image as an edge;

a distance image calculating unit that calculates a distance image representing a distance from the edge; and a ridge detecting unit that detects a ridge of the distance image, wherein the closed region size determining unit includes a ridge closed region size determining unit that determines the size of the initial closed region based on a distance from the edge to the ridge.

18. The image processing apparatus according to claim 15, wherein the initial closed region is set by joining a plurality of control points and is transformed by moving the control points, and the initial closed region setting unit includes a control point number determining unit that determines the number of the control points based on the size of the initial closed region.

19. The image processing apparatus according to claim 18, wherein the control point number determining unit includes an area calculating unit that calculates an area of the initial closed region and determines the number of the control points based on the area.

20. The image processing apparatus according to claim 18, wherein the control point number determining unit includes a perimeter calculating unit that calculates a perimeter of the initial closed region and determines the number of the control points based on the perimeter.

21. An image processing apparatus comprising:
a gradient strength calculating unit that calculates gradient strength of a pixel value of each pixel of an intraluminal image that is a captured image of an intralumen;
a closed region extracting unit that extracts a closed region from the intraluminal image, the closed region satisfying conditions that the pixel of which gradient strength is a predetermined value or more is not included in the closed region and a boundary of the closed region does not bend with predetermined curvature or higher toward an inner side of the closed region; and
an abnormal portion detecting unit that detects an abnormal portion located inside the closed region,
wherein the closed region extracting unit includes
an initial closed region setting unit that sets an initial closed region having an initial shape of the closed region based on the gradient strength;
an energy calculating unit that calculates values of a plurality of types of energy that at least include energy determined based on an outer shape of the closed region and energy determined based on the gradient strength on the boundary of the closed region;
an energy weighting factor setting unit that sets a weighting factor for at least one type of energy among the plurality of types of energy based on a position of the initial closed region; and
an energy weighted-sum calculating unit that calculates a weighted sum of the plurality of types of energy, and
wherein the closed region is extracted by transforming the initial closed region based on the weighted sum.

22. The image processing apparatus according to claim 21, wherein
the initial closed region is set by joining a plurality of the control points and is transformed by moving the control points,
the image processing apparatus further comprises a control point number determining unit that determines the number of control points based on a size of the initial closed region, and
the energy weighting factor setting unit sets the weighting factor according to the number of the control points.

23. The image processing apparatus according to claim 21, wherein
the initial closed region setting unit sets the initial closed region inside the flat area made up of a plurality of pixels of which values of the gradient strength inside the intraluminal image are close to one another,
the image processing apparatus further comprises an area shape information calculating unit that calculates shape information of a flat area, and
the energy weighting factor setting unit includes an area shape weighting factor setting unit that sets a weighing factor according to a shape of the flat area at a position at which the initial closed region is set based on shape information of the flat area.

24. The image processing apparatus according to claim 23, wherein
the area shape information calculating unit includes
a central line calculating unit that calculates a central line of the flat area; and
a curvature calculating unit that calculates curvature of the central line, and
wherein the area shape weighting factor setting unit sets a weighting factor for the energy determined based on the outer shape of the closed region to be larger as the curvature of the central line is larger.

25. The image processing apparatus according to claim 21, wherein
the initial closed region setting unit sets the initial closed region based on the edge on which a value of the gradient strength inside the intraluminal image is a predetermined value or higher,
the image processing apparatus further comprises
an end point detecting unit that detects an end point of an edge; and
a direction calculating unit that calculates a direction of the edge that is continuous to the end point as an end point direction, and
the energy weighting factor setting unit sets the weighting factor based on a position at which the initial closed region is set and the end point direction.

26. The image processing apparatus according to claim 25, wherein the energy weighting factor setting unit sets the weighting factor for the energy determined based on the outer shape of the closed region to be larger as an angle formed by a straight line joining the end point and the position, at which the initial closed region is set, and the end point direction is larger.

27. The image processing apparatus according to claim 21, wherein
the initial closed region setting unit sets the initial closed region based on the edge on which a value of the gradient strength inside the intraluminal image is a predetermined value or higher,
the image processing apparatus further comprises
a distance image calculating unit that calculates a distance image representing a distance from an edge;
a ridge detecting unit that detects a ridge of the distance image; and
a ridge shape information calculating unit that calculates shape information of the ridge, and
the energy weighting factor setting unit includes a ridge shape weighting factor setting unit that sets a weighting factor according to a shape of the ridge at the position at which the initial closed region is set based on the shape information of the ridge.

28. The image processing apparatus according to claim 27, wherein
the ridge shape information calculating unit includes a ridge curvature calculating unit that calculates curvature of the ridge, and
the ridge shape weighting factor setting unit sets a weighting factor for the energy determined based on the outer shape of the closed region to be larger as the curvature of the ridge is higher.

29. An image processing method comprising:
calculating gradient strength of a pixel value of each pixel of an intraluminal image that a captured image of an intralumen;
extracting a closed region from the intraluminal image, the closed region satisfying conditions that the pixel of which gradient strength is a predetermined value or more is not included in the closed region and a boundary of the closed region does not bend with predetermined curvature or higher toward an inner side of the closed region; and detecting an abnormal portion located inside the closed region, wherein the extracting includes setting an initial closed region that is an initial shape of the closed region based on the gradient strength;

calculating values of a plurality of types of energy that at least include energy determined based on an outer shape of the closed region and energy determined based on the gradient strength on the boundary of the closed region; and calculating a weighted sum of the plurality of types of energy, the closed region is extracted by transforming the initial closed region based on the weighted sum, and the setting includes determining a set range of the initial closed region based on the gradient strength.

30. An image processing method comprising:

calculating gradient strength of a pixel value of each pixel of an intraluminal image that is a captured image of an intralumen;

extracting a closed region from the intraluminal image, the closed region satisfying conditions that the pixel of which gradient strength is a predetermined value or more is not included in the closed region and a boundary of the closed region does not bend with predetermined curvature or higher toward an inner side of the closed region; and detecting an abnormal portion located inside the closed region, wherein the extracting includes setting an initial closed region having an initial shape of the closed region based on the gradient strength;

calculating values of a plurality of types of energy that at least include energy determined based on an outer shape of the closed region and energy determined based on the gradient strength on the boundary of the closed region;

setting a weighting factor for at least one type of energy among the plurality of types of energy based on a position of the initial closed region; and calculating a weighted sum of the plurality of types of energy, and the closed region is extracted by transforming the initial closed region based on the weighted sum.

31. A non-transitory computer-readable storage medium with an executable program stored thereon, wherein the program instructs a processor to perform:

calculating gradient strength of a pixel value of each pixel of an intraluminal image that is a captured image of an intralumen;

extracting a closed region from the intraluminal image, the closed region satisfying conditions that the pixel of which gradient strength is a predetermined value or more is not included in the closed region and a boundary of the closed region does not bend with predetermined curvature or higher toward an inner side of the closed region; and detecting an abnormal portion located inside the closed region, wherein the extracting includes setting an initial closed region having an initial shape of the closed region based on the gradient strength;

calculating values of a plurality of types of energy that at least include energy determined based on an outer shape of the closed region and energy determined based on the gradient strength on the boundary of the closed region; and calculating a weighted sum of the plurality of types of energy, the closed region is extracted by transforming the initial closed region based on the weighted sum, and the setting includes determining a set range of the initial closed region based on the gradient strength.

32. A non-transitory computer-readable storage medium with an executable program stored thereon, wherein the program instructs a processor to perform:

calculating gradient strength of a pixel value of each pixel of an intraluminal image that is a captured image of an intralumen;

extracting a closed region from the intraluminal image, the closed region satisfying conditions that the pixel of which gradient strength is a predetermined value or more is not included in the closed region and a boundary of the closed region does not bend with predetermined curvature or higher toward an inner side of the closed region; and detecting an abnormal portion located inside the closed region, wherein the extracting includes setting an initial closed region having an initial shape of the closed region based on the gradient strength;

calculating values of a plurality of types of energy that at least include energy determined based on an outer shape of the closed region and energy determined based on the gradient strength on the boundary of the closed region;

setting a weighting factor for at least one type of energy among the plurality of types of energy based on a position of the initial closed region; and calculating a weighted sum of the plurality of types of energy, and the closed region is extracted by transforming the initial closed region based on the weighted sum.

* * * * *